United States Patent
Zhang et al.

(10) Patent No.: US 12,273,207 B2
(45) Date of Patent: Apr. 8, 2025

(54) METHODS PROVIDING RESOURCE SELECTION FOR D2D COMMUNICATIONS AND RELATED COMMUNICATION DEVICES

(71) Applicant: Telefonaktiebolaget LM Ericsson (publ), Stockholm (SE)

(72) Inventors: Congchi Zhang, Shanghai (CN); Ricardo Blasco Serrano, Espoo (FI); Antonino Orsino, Kirkkonummi (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 418 days.

(21) Appl. No.: 17/799,491

(22) PCT Filed: Feb. 10, 2021

(86) PCT No.: PCT/EP2021/053126
§ 371 (c)(1),
(2) Date: Aug. 12, 2022

(87) PCT Pub. No.: WO2021/160632
PCT Pub. Date: Aug. 19, 2021

(65) Prior Publication Data
US 2023/0084524 A1 Mar. 16, 2023

Related U.S. Application Data

(60) Provisional application No. 62/976,050, filed on Feb. 13, 2020.

(51) Int. Cl.
*H04L 1/18* (2023.01)
*H04L 1/1867* (2023.01)
*H04L 5/00* (2006.01)
*H04W 72/02* (2009.01)
*H04W 72/04* (2023.01)
*H04W 72/0446* (2023.01)

(52) U.S. Cl.
CPC ............ *H04L 1/189* (2013.01); *H04L 1/1887* (2013.01); *H04L 5/0033* (2013.01);
(Continued)

(58) Field of Classification Search
CPC ..... H04L 1/1887; H04L 1/189; H04L 5/0023; H04L 5/0033; H04L 5/0044;
(Continued)

(56) References Cited

U.S. PATENT DOCUMENTS

2020/0295883 A1* 9/2020 Lee ..................... H04L 5/0057
2020/0374861 A1* 11/2020 Shilov .................... H04W 4/46
(Continued)

FOREIGN PATENT DOCUMENTS

WO 2019051782 A1 3/2019
WO 2019052249 A1 3/2019

OTHER PUBLICATIONS

3GPP, "3rd Generation Partnership Project; Technical Specification Group Radio Access Network; NR; Physical layer procedures for data (Release 16)", 3GPP TS 38.214 V16.0.0, Dec. 2019, 1-147.
(Continued)

*Primary Examiner* — Awet Haile
(74) *Attorney, Agent, or Firm* — Murphy, Bilak & Homiller, PLLC

(57) ABSTRACT

A method is provided that includes selecting a resource within a resource selection window for an initial transmission of a first Medium Access Control protocol data unit (MAC PDU) of a plurality of periodic MAC PDUs to be transmitted by a first communication device (TX UE) over a device-to-device, D2D, link to a second communication device (RX UE). The method further includes selecting a period (P) for periodic transmission of the plurality of periodic MAC PDUs so that initial transmissions of all MAC PDUs of the plurality of periodic MAC PDUs other
(Continued)

PERIODIC MULTIPLE MAC PDU TRANSMISSIONS WITH PERIOD LARGER THAN SCHEDULING WINDOW DURATION than the first MAC PDU occur in resources after the resource selection window. Communication devices (RX UE) and computer program products are also provided.

22 Claims, 17 Drawing Sheets

(52) U.S. Cl.
CPC .......... *H04L 5/0044* (2013.01); *H04L 5/0053* (2013.01); *H04L 5/0082* (2013.01); *H04L 5/0094* (2013.01); *H04W 72/02* (2013.01); *H04W 72/0446* (2013.01)

(58) Field of Classification Search
CPC ... H04L 5/0053; H04L 5/0082; H04L 5/0094; H04W 72/02; H04W 72/0446
See application file for complete search history.

(56) References Cited

U.S. PATENT DOCUMENTS

| | | | |
|---|---|---|---|
| 2021/0050979 A1* | 2/2021 | Hui | H04W 72/02 |
| 2021/0127365 A1* | 4/2021 | Wang | H04W 72/542 |
| 2021/0385808 A1* | 12/2021 | Kwak | H04W 28/26 |

OTHER PUBLICATIONS

3GPP, "3rd Generation Partnership Project; Technical Specification Group Radio Access Network; NR; Medium Access Control (MAC) protocol specification (Release 15)", 3GPP TS 38.321 V15.11.0, Dec. 2020, 1-79.

3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.5.1, Apr. 2019, 1-948.

3GPP, "3rd Generation Partnership Project; Technical Specification Group Radio Access Network; NR; Radio Resource Control (RRC) protocol specification (Release 15)", 3GPP TS 38.331 V15.8.0, Dec. 2019, pp. 1-532.

Catt, "On Mode 2 Resource allocation in NR V2X", 3GPP TSG RAN WG1 Meeting #97, R1-1906316, Reno, USA, May 13-17, 2019, 1-10.

Ericsson, "Resource allocation for Mode-2 transmissions", 3GPP TSG-RAN WG1 Meeting #98, R1-1908913, Prague, CZ, Aug. 26-30, 2019, 1-12.

Ericsson, "Support of HARQ procedure over sidelink", 3GPP TSG-RAN WG2 #108, TDoc R2-1915272, Reno, USA, Nov. 18-22, 2019, 1-7.

ZTE, et al., "Mode 2 resource allocation schemes on sidelink", 3GPP TSG RAN WG1 #98, R1-1908795, Prague, CZ, Aug. 26-30, 2019, 1-10.

ZTE, et al., "Summary of [105bis#31][NR/V2X] Resource pool configuration and selection (ZTE)", 3GPP TSG-RAN WG2 #106, R2-1906495, Reno, USA, May 13-17, 2019, 1-18.

Unknown, Author , "[Running CR] Introduction of 5G V2X with NR Sidelink", 3GPP TSG-RAN WG2 Meeting #108 R2-1916120, Reno, USA, Nov. 18-22, 2019, 1-38.

Unknown, Author , "Discussion on SL Mode 2 left issues", 3GPP TSG-RAN WG2 #109-e R2-2000882, (Revision of R2-1915378), Electronic Meeting, Feb. 24-Mar. 6, 2020, 1-6.

\* cited by examiner

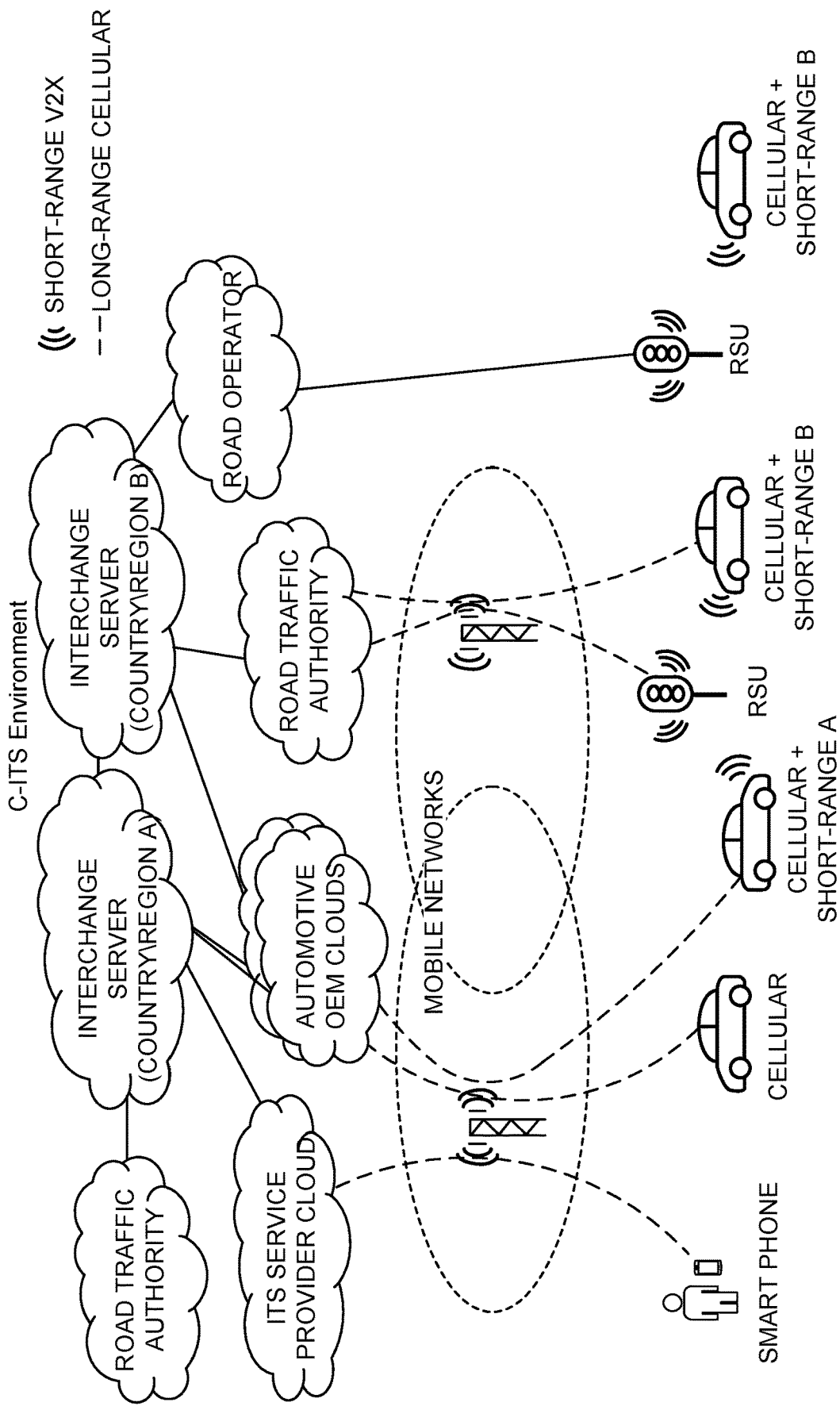

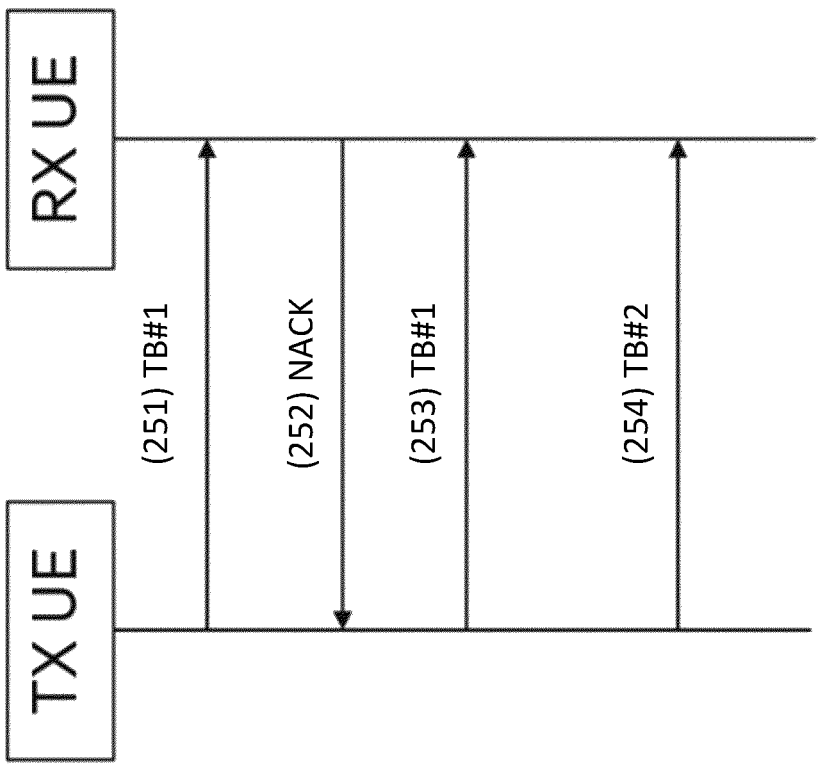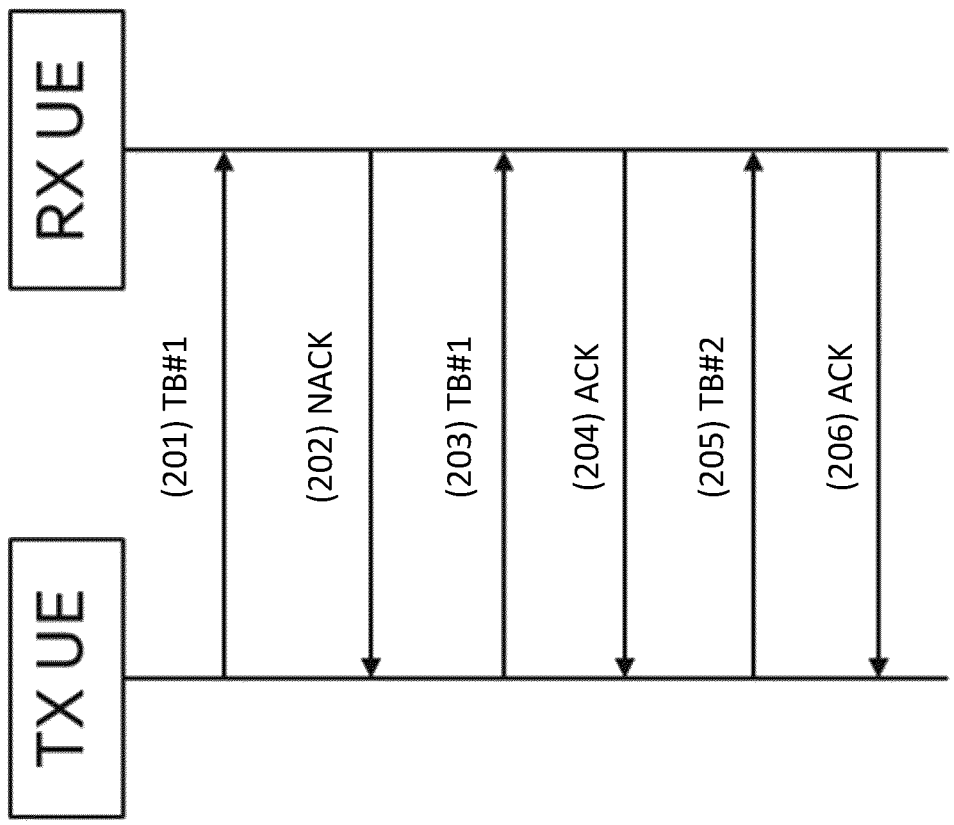

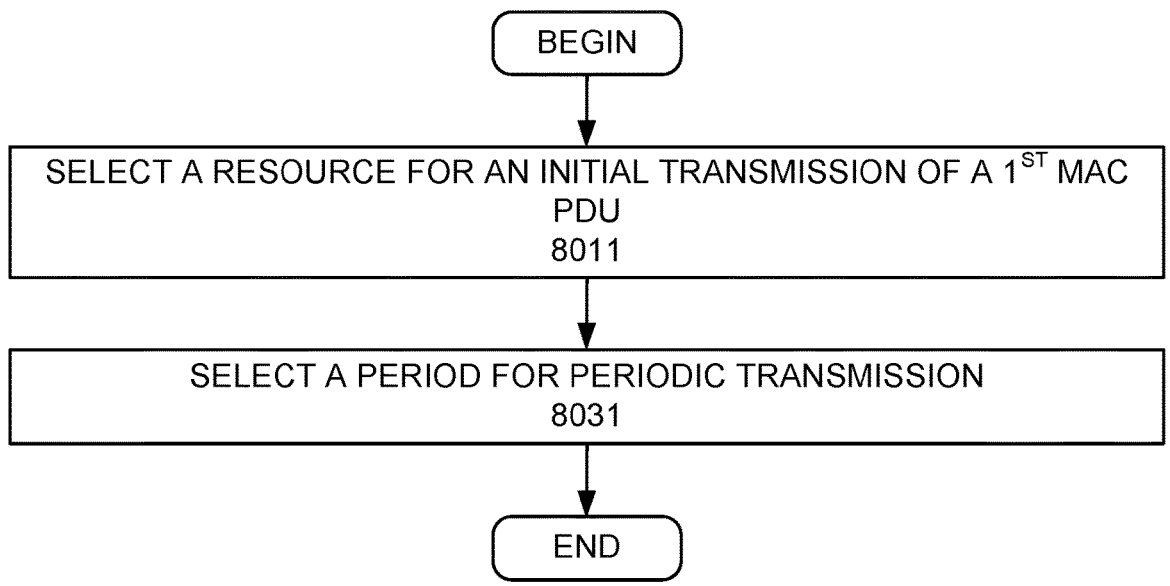
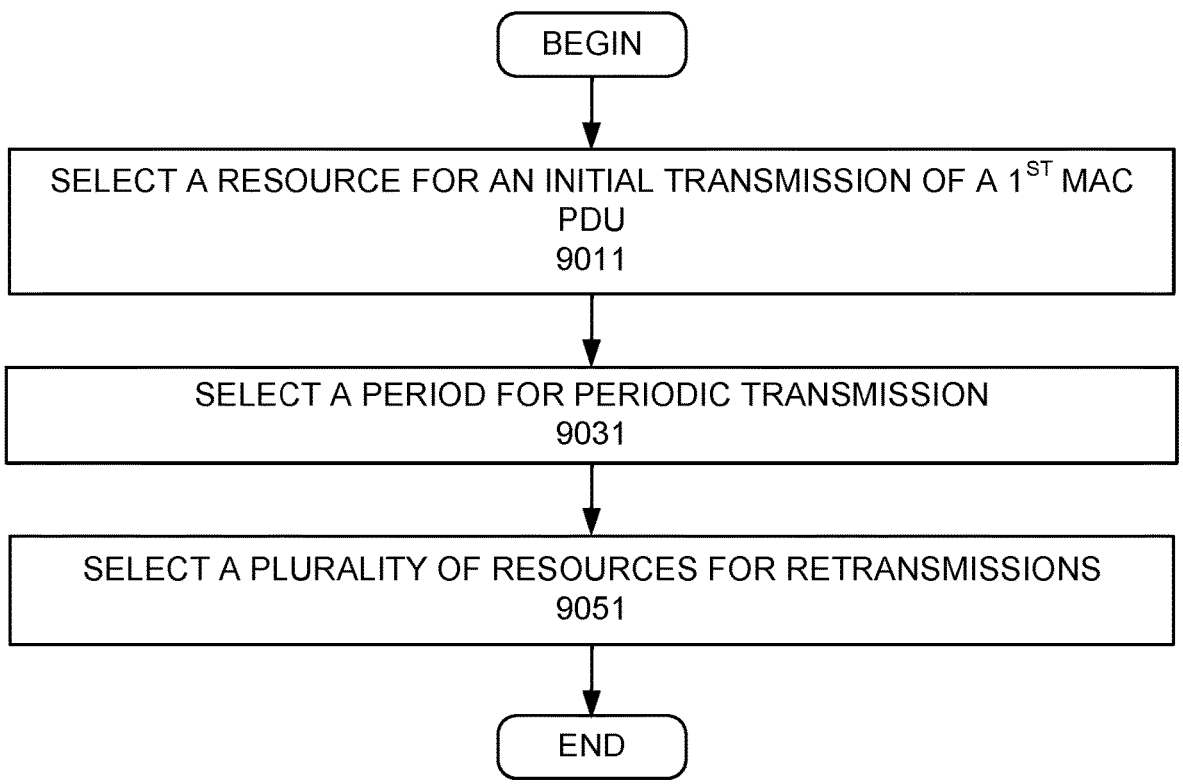

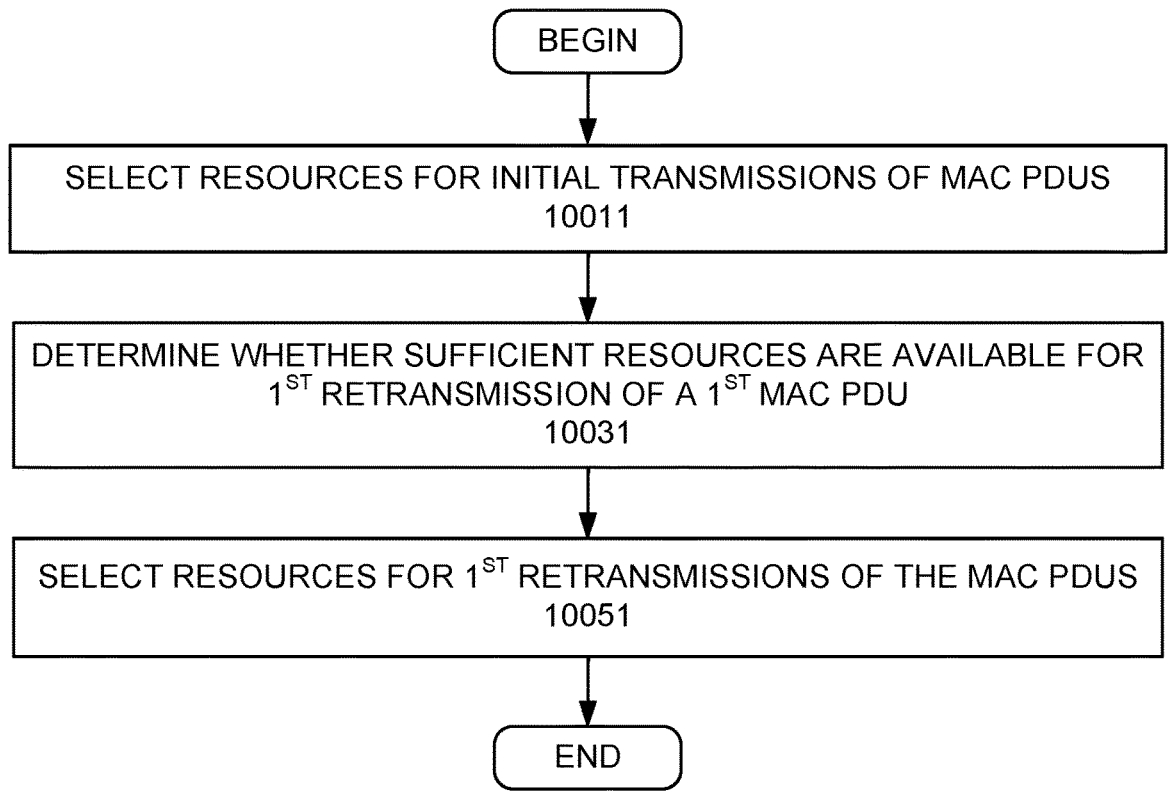
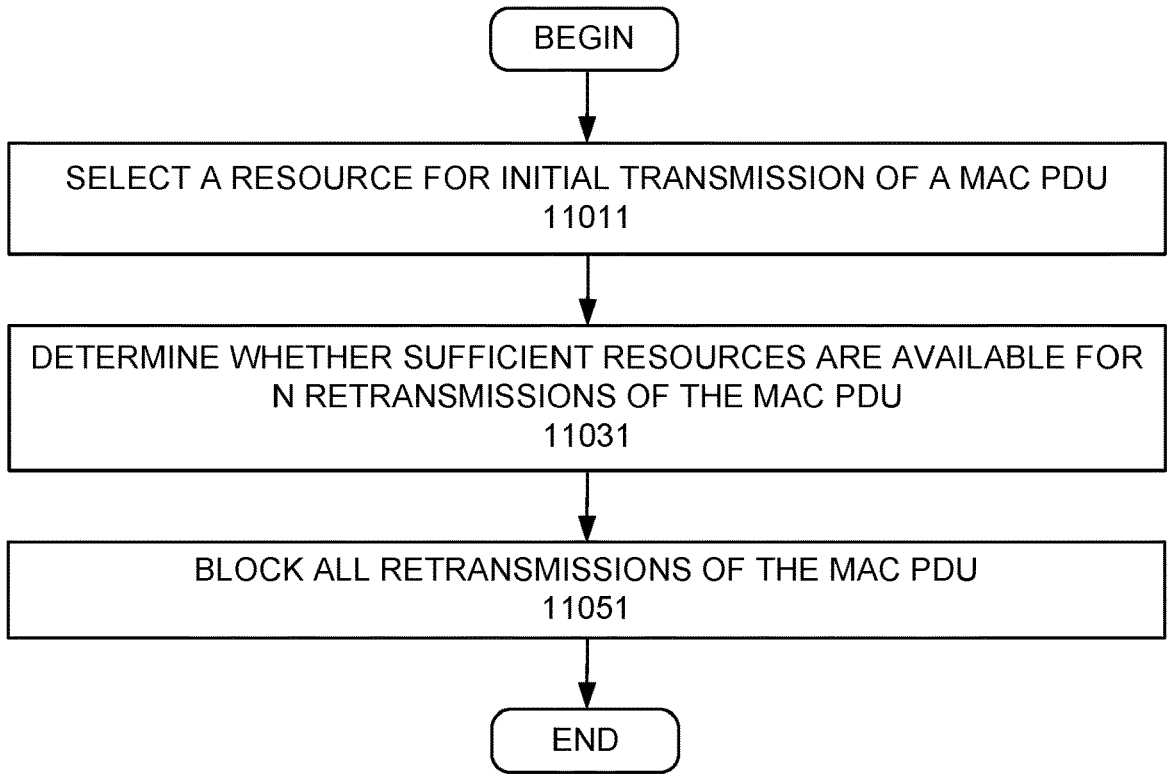

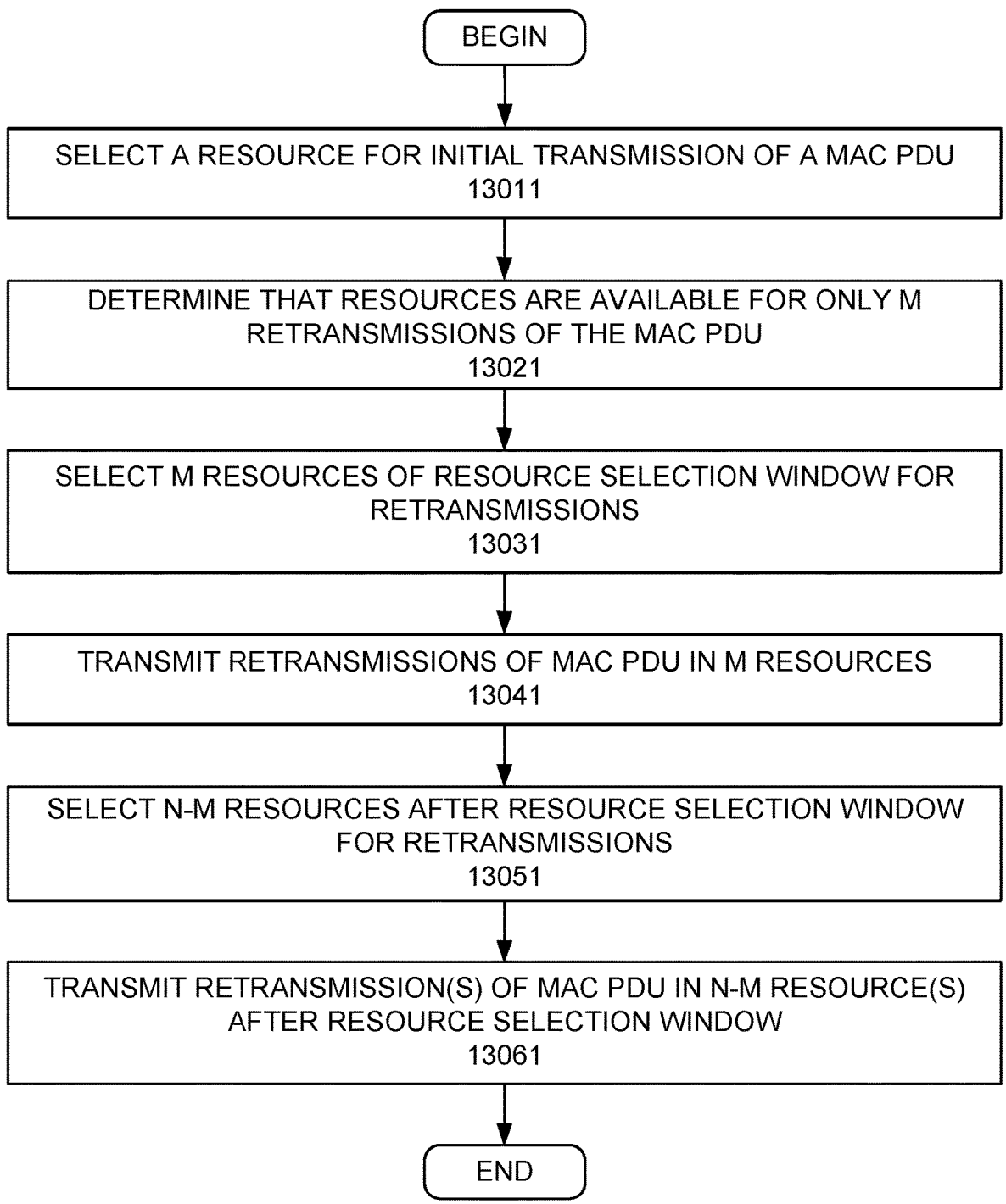

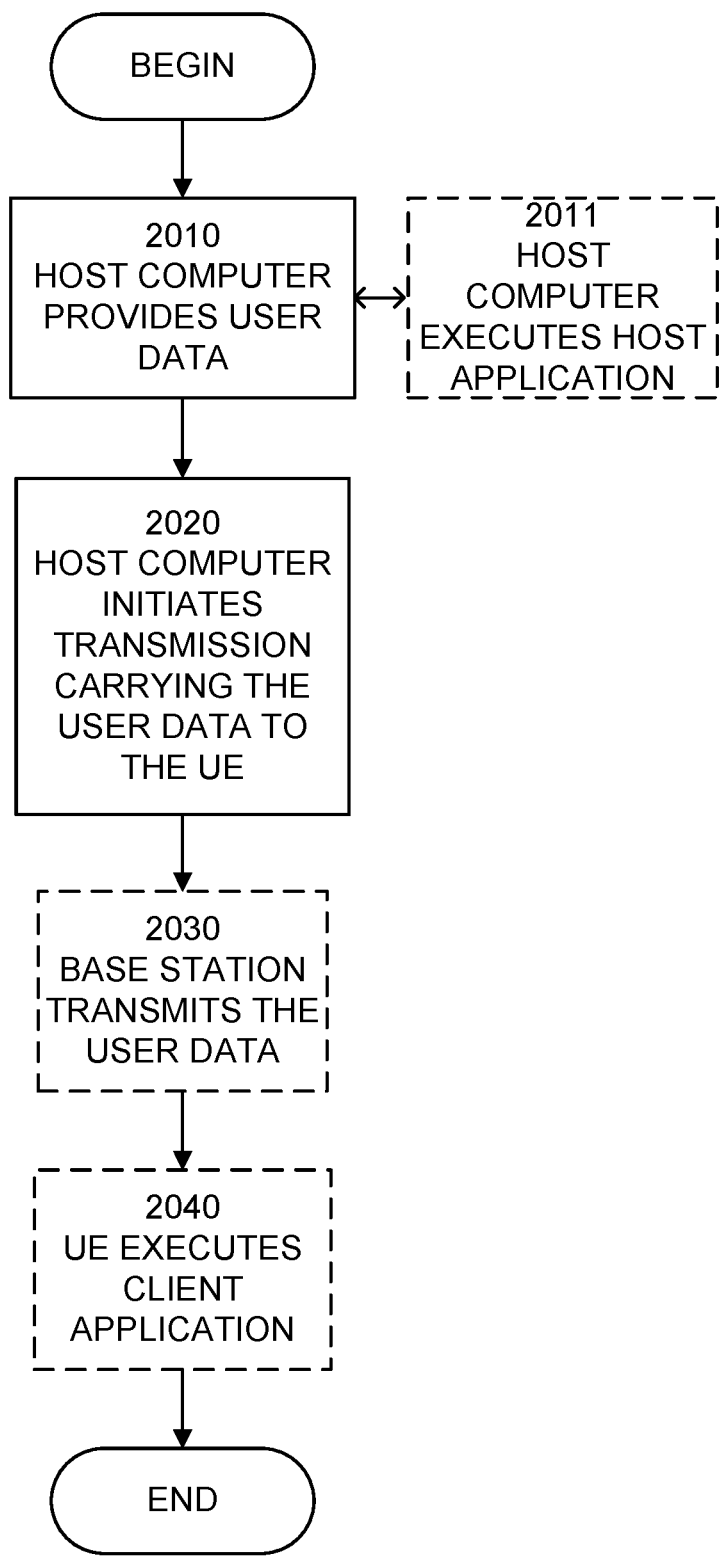
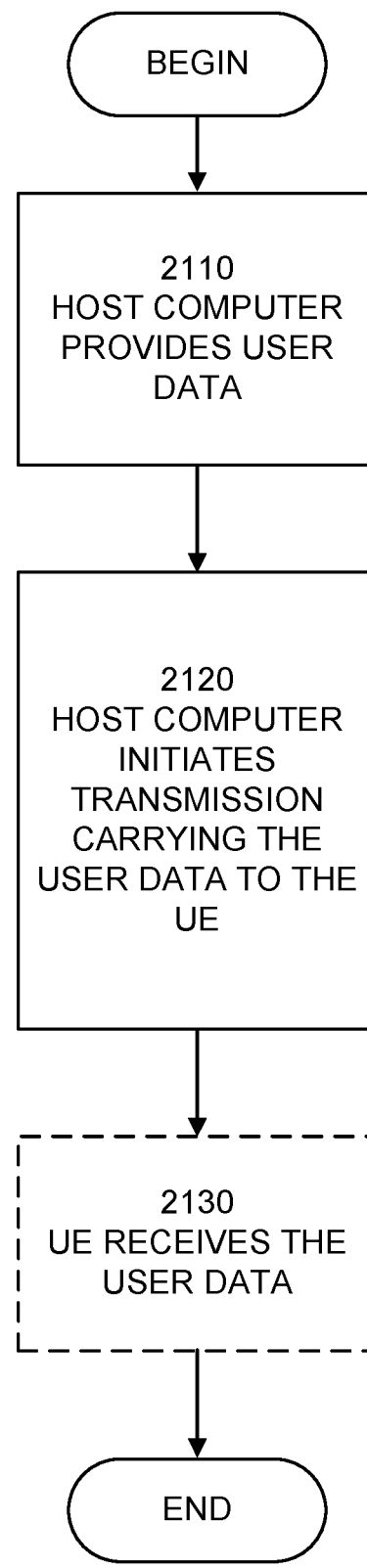
Figure 20
Figure 21

METHODS PROVIDING RESOURCE SELECTION FOR D2D COMMUNICATIONS AND RELATED COMMUNICATION DEVICES

TECHNICAL FIELD

The present disclosure relates generally to communications, and more particularly to communication methods and related devices and nodes supporting wireless communications.

BACKGROUND

Vehicle-to-anything V2X communications are discussed below.

Cellular Intelligent Transport Systems (ITS) aim to define a new cellular eco-system for the delivery of vehicular services and their dissemination. Such eco-systems include both short range and long range V2X service transmissions, as illustrated in the C-ITS environment of FIG. 1. In particular, short range communication involves transmissions over the Device-to-Device D2D link, also defined as a sidelink SL or PC5 interface in 3GPP, towards other vehicular UEs or roadside units (RSU). On the other hand, for long range transmission, transmission over the Uu interface between a user equipment (UE) and a base station is intended, in which case packets may be disseminated to different ITS service providers which could be road traffic authorities, road operators, automotive Original Equipment Manufactures OEMs, cellular operators, etc.

When it comes to the sidelink interface, the first standardization effort in 3GPP dates back to Release12, targeting public safety use cases. Since then, a number of enhancements have been introduced with the objective to enlarge the use cases that could benefit from the D2D technology. In particular, in Long Term Evolution (LTE) Rel-14 and Rel-15, the extensions for the device-to-device work include support for V2X communication, including any combination of direct communication between vehicles, pedestrians and/or infrastructure.

While LTE V2X mainly aims at traffic safety services, New Radio NR V2X has a much broader scope including not only basic safety services but also targeting non-safety applications, such as sensor/data sharing between vehicles with an objective to strengthen the perception of the surrounding environment. Hence, a new set of applications (such as multiple vehicle platooning, cooperative maneuver between vehicles, remote/autonomous driving, etc.) may enjoy such an enhanced sidelink framework.

In this new context, expected requirements to meet a desired/needed data rate, capacity, reliability, latency, communication range, and/or speed may be more stringent. For example, given the variety of services that can be transmitted over the sidelink, a robust Quality of Service (QoS) framework which takes into account the different performance requirements of the different V2X services may be useful/needed. Additionally, new radio protocols to handle more robust and/or reliable communication should be designed. All of this is currently under the investigation of 3GPP in NR Rel.16.

SUMMARY

The inventors have made several observations about the sidelink communications. These observations include:

UE behavior in case of not enough resources for required hybrid automatic repeat request (HARQ) retransmissions is unclear Without restriction on resource reservation interval selection, the HARQ retransmissions for periodic medium access control protocol data units (MAC PDUs) might collide.

Without sensing it is useless to have reservation, for both initial transmission and retransmission.

Resource reservation is not necessary in a resource pool dedicated and exclusive for a specific UE.

It may be too late to use the reserved resources for initial transmission if the services require very low latency.

It is unclear if multiple resource pools can be configured in a single carrier for sidelink (SL) transmission.

To enable HARQ feedback transmission, the selected resource pool must be configured with physical sidelink feedback channel (PSFCH) resource.

To obtain a Mode-2 grant, the UE first selects a pool and then applies the resource allocation procedure to the selected pool.

Various embodiments of inventive concepts address many of these observations.

According to some embodiments of inventive concepts, a method is provided that includes selecting a resource within a resource selection window for an initial transmission of a first Medium Access Control, MAC, protocol data unit, PDU, of a plurality of periodic MAC PDUs to be transmitted by the first communication device (TX UE) over a device-to-device, D2D, link to a second communication device (RX UE). The method further includes selecting a period (P) for periodic transmission of the plurality of periodic MAC PDUs so that initial transmissions of all MAC PDUs of the plurality of periodic MAC PDUs other than the first MAC PDU occur in resources after the resource selection window.

According to other embodiments of inventive concepts, a first communication device (TX/UE) is adapted to perform operations including selecting a resource within a resource selection window for an initial transmission of a first Medium Access Control, MAC, protocol data unit, PDU, of a plurality of periodic MAC PDUs to be transmitted by the first communication device (TX UE) over a device-to-device, D2D, link to a second communication device (RX UE). The operations further include selecting a period (P) for periodic transmission of the plurality of periodic MAC PDUs so that initial transmissions of all MAC PDUs of the plurality of periodic MAC PDUs other than the first MAC PDU occur in resources after the resource selection window.

According to some other embodiments of inventive concepts, a computer program code to be executed by at least one processor of a first communication device (TX/UE), whereby execution of the program code causes the first communication device (TX/UE) to perform analogous operations of the above method.

According to further embodiments of inventive concepts, a method is provided that includes selecting a resource for an initial transmission of a first Medium Access Control, MAC, protocol data unit, PDU, of a plurality of periodic MAC PDUs to be transmitted by the first communication device (TX UE) over a device-to-device, D2D, link to a second communication device (RX UE). The method further includes selecting a period for periodic transmission of the plurality of periodic MAC PDUs, so that a resource for an initial transmission of a second MAC PDU of the plurality of periodic MAC PDUs is determined based on the period. The method further includes selecting a plurality of resources for retransmissions of the first MAC PDU so that all retransmissions of the first MAC PDU occur before the resource for the initial transmission of the second MAC PDU.

According to other further embodiments of inventive concepts, a first communication device (TX/UE) is adapted to perform operations including selecting a resource for an initial transmission of a first Medium Access Control, MAC, protocol data unit, PDU, of a plurality of periodic MAC PDUs to be transmitted by the first communication device (TX UE) over a device-to-device, D2D, link to a second communication device (RX UE). The operations further include selecting a period for periodic transmission of the plurality of periodic MAC PDUs, so that a resource for an initial transmission of a second MAC PDU of the plurality of periodic MAC PDUs is determined based on the period. The operations further include selecting a plurality of resources for retransmissions of the first MAC PDU so that all retransmissions of the first MAC PDU occur before the resource for the initial transmission of the second MAC PDU.

According to some other embodiments of inventive concepts, a computer program code to be executed by at least one processor of a first communication device (TX/UE), whereby execution of the program code causes the first communication device (TX/UE) to perform analogous operations of the above method.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 1 is a diagram illustrating a C-ITS Environment;

FIGS. 2A and 2B are message diagrams respectively illustrating HARQ processes in SideLink with ACK/NACK and HARQ processes in Sidelink with NACK;

FIGS. 8, 9, 10, 11, 12, 13, and 14 are flow charts illustrating operations of a communication device UE according to some embodiments of inventive concepts;

FIG. 20 is a block diagram of methods implemented in a communication system including a host computer, a base station and a user equipment in accordance with some embodiments;

FIG. 21 is a block diagram of methods implemented in a communication system including a host computer, a base station and a user equipment in accordance with some embodiments;

DETAILED DESCRIPTION

Figure 3A:
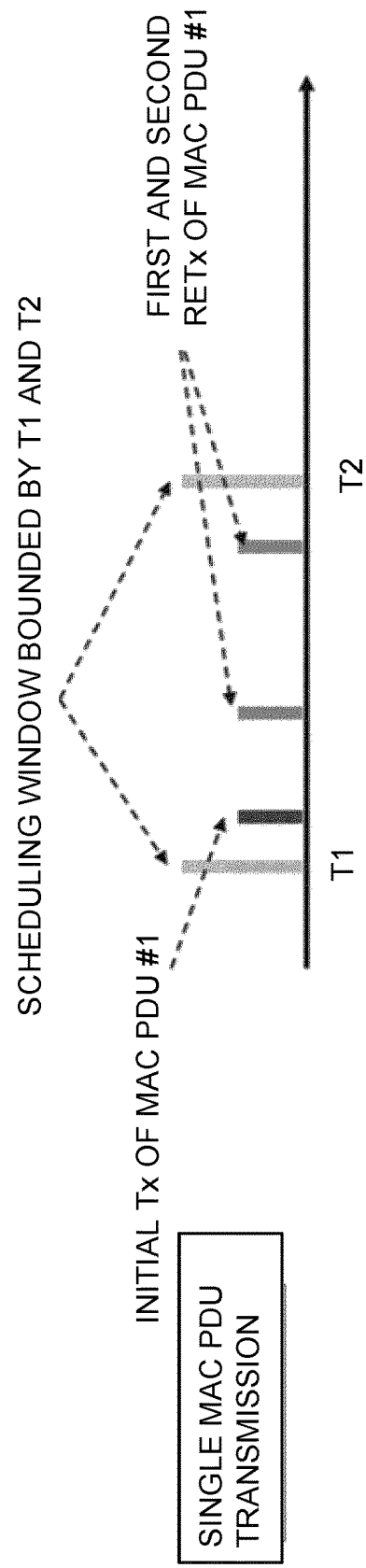
FIGS. 3A and 3B are timing diagrams respectively illustrating Resource selection for single MAC PDU transmission and Resource selection for periodic multiple MAC PDU transmissions.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

As previously indicated, the inventors have made several observations about the sidelink. These observations include:
  UE behavior in case of not enough resources for required HARQ retransmissions is unclear
  Without restriction on resource reservation interval selection, the HARQ retransmissions for periodic MAC PDUs might collide.
  Without sensing it is useless to have reservation, for both initial transmission and retransmission.
  Resource reservation is not necessary in a resource pool dedicated and exclusive for a specific UE.
  It may be too late to use the reserved resources for initial transmission if the services require very low latency.
  It is unclear if multiple resource pools can be configured in a single carrier for SL transmission.
  To enable HARQ feedback transmission, the selected resource pool must be configured with PSFCH resource.
  To obtain a Mode-2 grant, the UE first selects a pool and then applies the resource allocation procedure to the selected pool.

Two sidelink resource allocation (RA) modes are defined for NR-V2X sidelink communication, i.e. mode 1 RA, where base station schedules sidelink resource(s) to be used by UE, and mode 2 RA, where UE determines sidelink transmission resource(s) within sidelink resources configured by base station/network or pre-configured sidelink resources.

During 3GPP RAN1 #96 meeting, the following related to mode 2 RA was agreed:

Blind retransmissions of a TB are supported for SL by NR-V2X.

Details are for the WI phase.

NR V2X Mode-2 supports reservation of sidelink resources at least for blind retransmission of a TB.

Whether reservation is supported for initial transmission of a TB is to be discussed in the work item (WI) phase.

Whether reservation is supported for potential retransmissions based on HARQ feedback is for the WI phase.

During 3GPP RAN1 #96bis meeting, the following related to mode 2 RA was agreed:

NR V2X supports an initial transmission of a TB without reservation, based on sensing and resource selection procedure NR V2X supports reservation of a sidelink resource for an initial transmission of a TB at least by an SCI associated with a different TB, based on sensing and resource selection procedure This functionality can be enabled/disabled by (pre-) configuration FFS Standalone PSCCH transmissions for resource reservations are supported in NR V2X.

Issues that were not agreed upon include issues on resource selection for HARQ retransmissions. In the context of sidelink resource allocation, the focus is on resource reservation in mode 2 resource allocation. Further, issues related to multiple resource pool configuration and mode 2 resource pool selection were also not agreed upon.

Prior to discussing embodiments of inventive concepts that address some of these issues, a communication device UE shall be described that can be used in the inventive concepts.

FIG. 3 is a block diagram illustrating elements of a communication device UE 300 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of inventive concepts. (Communication device 300 may be provided, for example, as discussed below with respect to wireless device 1510 of FIG. 15.) As shown, communication device UE may include an antenna 307 (e.g., corresponding to antenna 1511 of FIG. 15), and transceiver circuitry 301 (also referred to as a transceiver, e.g., corresponding to interface 1514 of FIG. 15) including a transmitter and a receiver configured to provide uplink and downlink radio communications with a base station(s) (e.g., corresponding to network node 1560 of FIG. 15, also referred to as a RAN node) of a radio access network. Communication device UE may also include processing circuitry 303 (also referred to as a processor, e.g., corresponding to processing circuitry 1520 of FIG. 15) coupled to the transceiver circuitry, and memory circuitry 305 (also referred to as memory, e.g., corresponding to device readable medium 1530 of FIG. 15) coupled to the processing circuitry. The memory circuitry 305 may include computer readable program code that when executed by the processing circuitry 303 causes the processing circuitry to perform operations according to embodiments disclosed herein. According to other embodiments, processing circuitry 303 may be defined to include memory so that separate memory circuitry is not required. Communication device UE may also include an interface (such as a user interface) coupled with processing circuitry 303, and/or communication device UE may be incorporated in a vehicle.

As discussed herein, operations of communication device UE may be performed by processing circuitry 303 and/or transceiver circuitry 301. For example, processing circuitry 303 may control transceiver circuitry 301 to transmit communications through transceiver circuitry 301 over a radio interface to a radio access network node (also referred to as a base station) and/or to receive communications through transceiver circuitry 301 from a RAN node over a radio interface. Moreover, modules may be stored in memory circuitry 305, and these modules may provide instructions so that when instructions of a module are executed by processing circuitry 303, processing circuitry 303 performs respective operations (e.g., operations discussed below with respect to Example Embodiments relating to wireless communication devices).

Hybrid Automatic Repeat Request HARQ in sidelink is discussed below.

In NR, HARQ processes for SL unicast and groupcast are supported. There are two options in terms of HARQ feedback signalling discussed below, ACK/NACK and NACK only.

When ACK/NACK is configured, the receiver UE provides feedback of an ACK or a NACK to the transmitter UE indicating if the Transport Block (TB) is received correctly (ACK) or not (NACK), respectively. If it's NACK, the transmitter UE will retransmit the same TB until an ACK is received or until the maximum number of retransmissions is reached.

FIG. 2A is a message diagram illustrating an example of a Sidelink HARQ process with ACK/NACK. At operation 201, the transmitting UE (TX UE) transmits an initial transmission of the first transport block TB #1. Responsive to the receiving UE (RX UE) receiving the scheduling assignment SA for transport block TB #1 at operation 201 but not successfully decoding the transport block TB #1, the receiving UE transmits a NACK at operation 202. Responsive to receiving the NACK at operation 202, the transmitting UE retransmits the first transport block TB #1 at operation 203. Responsive to the receiving UE successfully decoding the transport block TB #1 at operation 203, the receiving UE transmits an ACK at operation 204. Having received the ACK at operation 204, the transmitting UE can transmit a second transport block TB #2 at operation 205. Responsive to successfully receiving/decoding the second transport block TB #2 at block 205, the receiving UE transmits an ACK at block 206.

When NACK only is configured, the receiver UE RX UE is configured to send NACK when the reception fails, but the receiver UE does not send any feedback when the reception succeeds. That is, if the receiver UE decodes the scheduling assignment (SA) but fails to decode the TB, it transmits a NACK. Otherwise (i.e., if it correctly decodes both SA and TB or if it fails to decode the SA), it does not transmit anything. If the TX UE does not receive a NACK, it assumes that the reception was successful and that it can therefore transmit new TBs. However, in this case, there is no distinction between the cases when a receiver UE does not send any feedback due to failed control information (SA) decoding and when the receiver UE decodes data successfully but decide not to send the feedback.

FIG. 2B is a message diagram illustrating an example of a Sidelink HARQ process with NACK only. At operation 251, the transmitting UE (TX UE) transmits an initial transmission of the first transport block TB #1. Responsive to the receiving UE (RX UE) receiving the scheduling assignment SA for transport block TB #1 at operation 201 but not successfully decoding the transport block TB #1, the receiving UE transmits a NACK at operation 252. Responsive to receiving the NACK at operation 202, the transmitting UE retransmits the first transport block TB #1 at operation 253. Responsive to not receiving a NACK corresponding to the second transmission of the first transport block TB #1 at operation 253, the transmitting UE transmits the second transport block TB #2 at operation 254. After non-reception of a NACK after operation 253, the transmitting UE thus assumes that the first transport block TB #1 was successfully received/decoded by the receiving UE at operation 253. It is possible, however, that the receiving UE did not receive the scheduling assignment SA of operation 253 so that the receiving UE did not receive the second transmission of the first transport block and did not send a NACK.

Mode 2 resource allocation is discussed below.

In NR SL, the UE can autonomously select resources for transmission (i.e., mode 2) based on randomness and/or sensing. More specifically, within a scheduling window determined by a (pre)configured resource pool and other parameters (e.g., T1 and T2), a UE Medium Access Control MAC entity can randomly select a set of resources to generate and transmit MAC Protocol Data Units PDU(s). In another case, a UE can also read sidelink control information (SCI) from other UEs to understand which resources are reserved/occupied, and only select resources that are available to generate and transmit MAC PDU(s).

Besides, NR SL supports resource allocation for a single MAC PDU or for periodic transmissions of multiple MAC PDUs. In both cases, the UE can simultaneously select and reserve a maximum of 2 times HARQ retransmission opportunities for each MAC PDU. The number of HARQ retransmissions and the period of transmission are determined by the MAC entity before resource allocation.

If the UE MAC entity selects resources for transmission of a single MAC PDU and retransmissions, the following operations are performed, where FIG. 3A illustrates resource selection for a single MAC PDU transmission.

The MAC entity first selects resources for the initial transmission within the scheduling window.

If there are resources available within the scheduling window, the MAC entity further selects resources for the HARQ retransmission(s).

The resource reservation information will be conveyed in Sidelink Control Information (SCI).

Figure 3B:
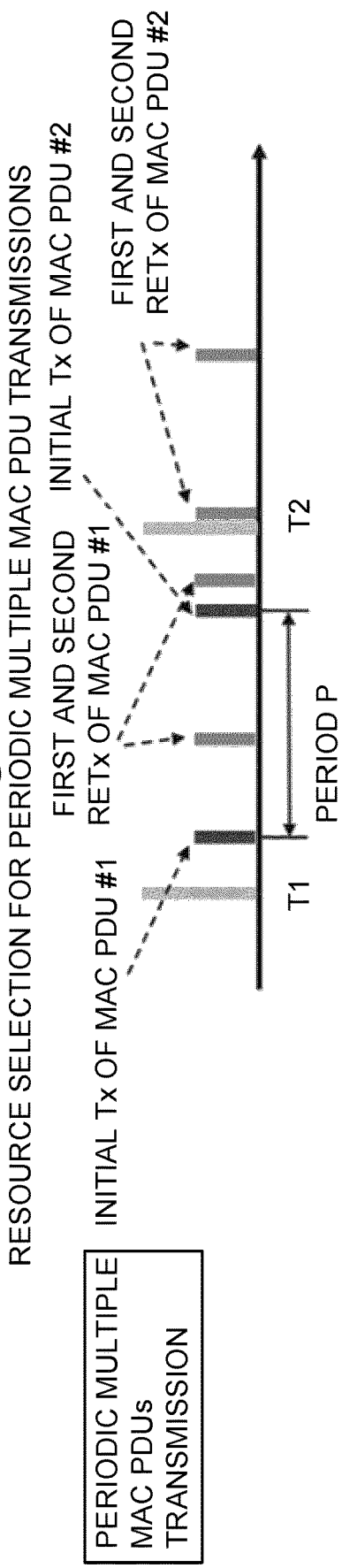

If MAC entity selects resources for periodic transmissions of multiple MAC PDUs and associated retransmissions, the following operations are performed, where FIG. 3B illustrates resource selection for periodic multiple MAC PDU transmissions.

The MAC entity first selects resources for the initial transmission of the first MAC PDU within the scheduling window.

Then, the MAC entity uses the selected resources for the initial transmission of the first MAC PDU to reserve resources for the second, third . . . MAC PDUs in the future using a period value. For example, if the initial transmission of the first MAC PDU is scheduled at slot T, then the initial transmission of the second, third . . . MAC PDUs will be at T+P, T+2*P, . . . .

If there are resources available within the scheduling window, the MAC entity further selects resources for the retransmissions of the first MAC PDU.

Then, the MAC entity uses the selected resources for the retransmissions of the first MAC PDU to reserve resources for the retransmission of the second, third . . . MAC PDUs in the future using a period value. For example, if the retransmission of the first MAC PDU is scheduled at slot T, then the retransmission of the second, third . . . MAC PDUs will be at T+P, T+2*P, . . . .

The approve operations are indicated by the single underline in the following text (associated with 3GPP TS 38.321, running CR):

5.x.1.1:

If the MAC entity is configured by RRC to transmit using pool(s) of resources in a carrier as indicated in 3GPP TS 38.331 or 3GPP TS 36.331 based on sensing or random selection, the MAC entity shall for each Sidelink process:

1> if the MAC entity selects to create a configured sidelink grant corresponding to transmissions of multiple MAC PDUs, and SL data is available in a logical channel:

2> perform the TX resource (re-)selection check as specified in clause 5.x.1.2;

2> if the TX resource (re-)selection is triggered as the result of the TX resource (re-) selection check;

3> select one of the allowed values configured by RRC in reservationPeriodAllowed and set the resource reservation interval with the selected value;

3> randomly select, with equal probability, an integer value in the interval [5, 15] for the resource reservation interval higher than or equal to 100 ms and set SL_RESOURCE_RESELECTION_COUNTER to the selected value;

. . . .

3> randomly select the time and frequency resources for one transmission opportunity from the resources indicated by the physical layer according to clause 8.1.4 of TS 38.214, according to the amount of selected frequency resources and the remaining PDB of SL data available in the logical channel(s) allowed on the carrier.

3> use the randomly selected resource to select a set of periodic resources spaced by the resource reservation interval for transmissions of PSCCH and PSSCH corresponding to the number of transmission opportunities of MAC PDUs determined in TS 38.214;

3> if one or more HARQ retransmissions are selected:

4> if there are available resources left in the resources indicated by the physical layer according to clause 8.1.4 of TS 38.214 for more transmission opportunities:

. . . .

5> consider the set of new transmission opportunities and retransmission opportunities as the selected sidelink grant.

3> else:
  4> consider the set as the selected sidelink grant;
  3> use the selected sidelink grant to determine the set of PSCCH durations and the set of PSSCH durations according to 3GPP TS 38.214;
  3> consider the selected sidelink grant to be a configured sidelink grant.

According to the MAC procedures that are being standardized for sidelink, the following issues have been identified.

In both single MAC PDU and periodic multiple MAC PDU transmission scenarios, UE behavior is not clear (i.e., procedural text is missing) in the event that insufficient resources are available for retransmissions, especially when multiple retransmissions are required.

In other words, it is not clear what will happen if the available resources are not enough for the required number of HARQ retransmissions. For example, N times HARQ retransmission is selected for one MAC PDU, however the available resources can only support N−1 times HARQ retransmission. The simplest way out is to not do any HARQ retransmission. Another alternative is to only perform those number of HARQ retransmissions that can be supported and forget about those left.

Figure 4:
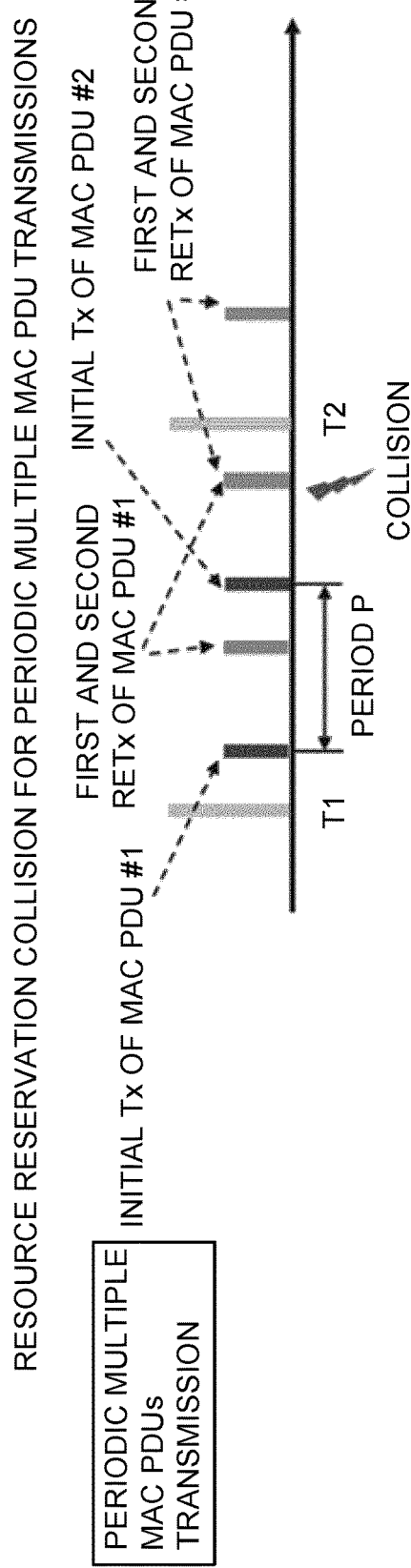
FIG. 4 is a timing diagram illustrating Resource reservation collision for periodic multiple MAC PDU transmissions.

In the scenario of periodic multiple MAC PDUs transmission, it may happen that a resource selected for retransmissions of one MAC PDU may collide with resources reserved for the retransmission of future MAC PDUs. An example of a resource reservation collision for periodic multiple MAC PDU transmissions is illustrated in FIG. 4. For example:

In FIG. 4, the UE selects slot 10 and slot 20 for retransmissions of the first MAC PDU.

Given a period of 10 slots, the retransmissions of the second MAC PDU will occur at slot 20 and 30.

In this situation, the second retransmission of the first MAC PDU and the first retransmission of the second MAC PDU will collide.

FIG. 4 illustrates Resource reservation collision for periodic multiple MAC PDUs transmission.

Observation 1 UE behavior in case of not enough resources for required HARQ retransmissions is unclear.

Thus, when selecting resources for periodic MAC PDUs, the UE first selects resources for the initial transmission and required HARQ retransmissions for the first MAC PDU, then extends the selected set of resources for future MAC PDUs by based on the selected reservation interval as highlighted by the double underline in the text above. For example, as illustrated in FIG. 4, the initial transmission and HARQ retransmission of MAC PDU #1 are selected within the scheduling window bounded by T1 and T2, then the initial transmission of the MAC PDU #2 will take place P slots (i.e., the period) after the initial transmission of MAC PDU #1, so as for HARQ retransmissions. However, there is a chance that the resources selected for the retransmission of MAC PDU #1 collides with the resources reserved for the retransmission of MAC PDU #2. For example, if the first and second retransmission of MAC PDU #1 are scheduled at slot 10 and 20, given a period of 10 slot the first retransmission of MAC PDU #2 will occur at slot 20 which collides with the second retransmission of MAC PDU #1.

According to some embodiments of inventive concepts, improved/proper resource reservation for SL MAC PDU retransmissions may be provided. The UE provides/ensures no/reduced collision among resource reservations for retransmission of different MAC PDUs. In addition, operations may be provided to handle the case where available resources are insufficient to support all requested retransmissions and UE actions to handle this case are clarified by reducing/avoiding any unexpected behavior.

According to some embodiments of inventive concepts, issues regarding resource reservation for retransmissions in NR SL may be addressed, and some embodiments may be applied to other D2D radio access technologies.

According to some embodiments, when selecting resources for retransmission of MAC PDU(s), the UE provides that no/reduced collision among resource reservations for retransmission of different MAC PDUs may occur. In addition, operations may be provided to handle cases where available resources are insufficient to support all requested retransmissions.

Methods to provide reduced/no resource reservation collision are discussed below.

Figure 5:
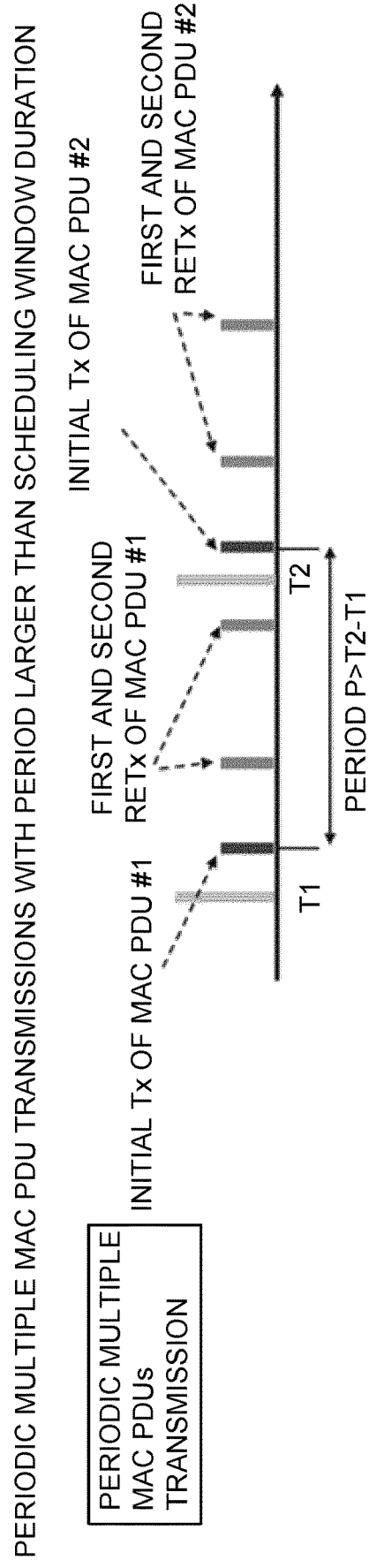
FIG. 5 is a timing diagram illustrating periodic multiple MAC PDU transmissions with a period larger than a resource selection window (also referred to as a scheduling window) duration according to some embodiments of inventive concepts.

According to some embodiments, for periodic multiple MAC PDU transmissions, when determining the transmission period, UE considers the boundary of the scheduling window indicated from physical layer and only selects a value from a set of candidates that fulfill any of the following:

The selected period is equal or larger than the duration of scheduling window, i.e. T2−T1, as illustrated in FIG. 5.

The selected period is equal or larger than the scheduling window upper bound, i.e. T2.

Thus, in some embodiments of inventive concepts, to resolve this issue, when selecting the resource reservation interval from reservationPeriodAllowed, the duration of the selection window (i.e. T2−T1) must be taken into account. In particular, the resource reservation interval has to be larger than the selection window duration (i.e. T2−T1), such that the initial transmission of the next MAC PDU will be scheduled after the HARQ retransmissions of the current MAC PDU.

As shown in FIG. 5, Periodic multiple MAC PDUs may be transmitted with a period larger than the scheduling window duration.

Figure 6:
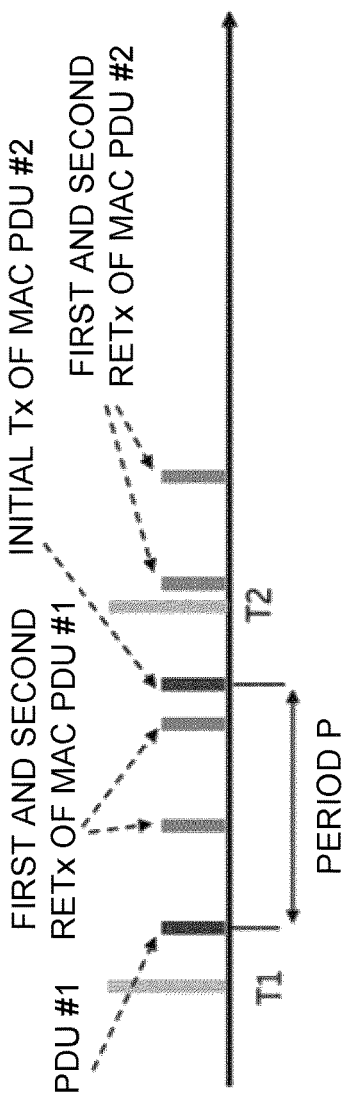
FIG. 6 is a timing diagram illustrating periodic multiple MAC PDU transmissions with retransmission opportunities before the initial transmission of the future/next MAC PDU according to some embodiments of inventive concepts.

According to some other embodiments, for periodic multiple MAC PDU transmissions, when selecting resources for retransmission of the one MAC PDU, only resources before the initial transmission of the next MAC PDU are selected as illustrated in FIG. 6. Here, resources for initial transmissions of multiple MAC PDUs are selected before retransmission opportunities. According to such embodiments, there is no restriction on transmission period determination.

As shown in FIG. 6, transmission of periodic multiple MAC PDUs may be provided with retransmission opportunities for each MAC PDU being provided before the initial transmission of the next MAC PDU.

In still other embodiments, for periodic multiple MAC PDU transmissions, the resource reservation for MAC PDU retransmissions is done in a per retransmission manner. Note that in the legacy procedure, resources (for example, requested 2 retransmissions for the first MAC PDU) are selected at once and extended for future MAC PDU retransmissions. More specifically, assuming 2 times retransmissions is requested, Operation 1: UE first selects resources for the initial transmission of the first MAC PDU, e.g. at slot T.

Operation 2: Then, UE reserves resources for the initial transmission for future MAC PDUs, e.g. at slot T+P, T+2*P, . . . .

Operation 3: If there are resources available, UE selects resources for the first retransmission of the first MAC PDU, e.g. at slot Ta.

Operation 4: Then, UE reserves resources for the first retransmissions of future MAC PDUs, e.g. at slot Ta+P, Ta+2*P, . . . .

Operation 5: UE loops step 3 and step 4 for the next retransmission of the first MAC PDU.

Methods to handle insufficient resources for all requested HARQ retransmissions of a MAC PDU are discussed below.

According to some embodiments, the UE will not perform any retransmission if the available resources within the scheduling window are insufficient for all requested retransmissions. For example, if the available resources can only support N−1 times retransmission while N times retransmissions are required, the UE will not perform any retransmission at all for this MAC PDU.

According to some other embodiments, the UE will only perform the number of retransmissions that can be supported within the scheduling window and ignore the remaining requested retransmissions. For example, if the available resources can only support N−1 times retransmission while N times retransmissions are required, then the UE will only perform N−1 times retransmissions and ignore the remaining retransmission.

According to still other embodiments, the UE will first execute the number of retransmissions that can be supported within the scheduling window. The UE will further select resources for the remaining requested retransmissions when the scheduling window shifts and new available resources appear. The information about resource reservations for the remaining requested retransmissions will be conveyed in the next SCI after the resource reservation is made. For example, if the available resources can only support N−5 times retransmission while N times retransmissions are requested, corresponding operations are discussed below.

Operation 1: The UE continues performing N−5 times retransmission as scheduled within the scheduling window.

Operation 2: When the scheduling window shifts and new available resources appear, the UE will further select resources for the remaining 5 times retransmission and send in the next SCI about the new reservation.

Observation 2 Without restriction on resource reservation interval selection, the HARQ retransmissions for periodic MAC PDUs might collide.

Thus, when reservation is enabled, a physical shared control channel (PSCCH) for resource reservation is transmitted in a resource which is deemed to be idle. When a surrounding UE wants to transmit, the UE first detects and decodes the PSCCH for resource reservation, and avoids to select resources indicated in the PSCCH for its own transmission, so as to avoid a collision. It can be seen that sensing is the foundation to make reservation really useful. Without sensing it is useless to have reservation, for both initial transmission and retransmission, as a UE will neglect whether a resource is reserved or not when it selects resource for its own transmission.

Observation 3 Without sensing it is useless to have reservation, for both initial transmission and retransmission.

On the other hand, in some cases the sensing functionality is not available. For instance, in exceptional resource pool only random resource selection is supported, and in a resource pool used for V2X communication, it could be configured so that only random resource selection is allowed. Therefore, resource reservation should be disabled for the pools where sensing is not supported or allowed.

For a connected UE adopting either mode 1 or mode 2 RA, the NW could configure dedicated and exclusive Tx resource pool for it. In this case and when mode 2 RA the UE knows what resource is available in the resource pool and is able to select a collision free resource for (re) transmission even without sensing, naturally reservation is also not needed in this case.

Observation 4 Resource reservation is not necessary in a resource pool dedicated and exclusive for a specific UE.

Another aspect worth discussion is whether/how to support resource reservation for initial transmission. In R1-1908913, Resource allocation for Mode-2 transmissions, Ericsson, 3GPP Ran1 #98 meeting, Prague, October 2019, methods are proposed to enable reservation for initial transmission. On the other hand, it may be too late to use the reserved resources if the services require very low latency. Indeed, reservation of the initial transmissions would add a delay to the transmission of a TB. However, for latency critical cases, the delays in transmissions of a TB have to be minimized. Considering this, resource reservation of initial transmission could be disabled for services for which the required latency is below a certain level.

Observation 5 It may be too late to use the reserved resources for initial transmission if the services require very low latency.

In the 3GPP RAN2 #106 meeting, it was confirmed that only single carrier is assumed for SL transmission in release 16. However, it is still open if one carrier can be configured with single or multiple resource pools.

RAN2 #106/Agreements on LCP:
1: As, in release 16, only single carrier is used for SL transmission, RAN2 assumes mapping restriction between SCS and Sidelink LCH should not be considered in SL LCP procedure Observation 6 It is unclear if multiple resource pools can be configured in a single carrier for SL transmission.

In another aspect, NR SL supports different HARQ configurations, and the transmitted TB may request ACK/NACK feedback, or NACK only feedback, or no feedback at all. Transmitting a HARQ feedback must use the PSFCH resource configured in the same resource pool as agreed in 3GPP RAN1 #96bis meeting, presented below. Therefore, selection of resource pool must consider if the resource pool can support demanded HARQ procedure.

RAN1 #96bis meeting/Agreements:
It is supported, in a resource pool, that within the slots associated with the resource pool, PSFCH resources can be (pre)configured periodically with a period of N slot(s)
N is configurable, with the following values
1
At least one more value >1
FFS details
The configuration should also include the possibility of no resource for PSFCH. In this case, HARQ feedback for all transmissions in the resource pool is disabled
HARQ feedback for transmissions in a resource pool can only be sent on PSFCH in the same resource pool.

Observation 7 To enable HARQ feedback transmission, the selected resource pool must be configured with PSFCH resource.

In Mode 1, when gNB assigns SL grant to a UE, the resource pool selection is implicitly considered and whether the given SL grant is expecting a HARQ feedback is indicated in the DCI as proposed in R2-1915272, Support on HARQ procedure over sidelink, 3GPP TSG RAN2 Meeting #108, November 2019.

In Mode 2, the UE must autonomously select resources for transmission, which may be organized in multiple transmit pools. As stated above, a transmission pool may or may not be configured with feedback PHY resources (i.e., PSFCH resources). Thus, the UE must first select a pool. The selection of the pool may be restricted, at least, by the HARQ mode required for transmission. Once the pool is selected, the resource allocation procedure determines the resources to be used for transmission. In this way, by appropriately selecting the pool and resources from within that pool, the resulting grant is suitable for requesting SL HARQ feedback, if so required. Example restrictions could be:

For SL transmissions triggered by data that requires HARQ feedback, a resource pool with PSFCH resource is selected.

For SL transmissions triggered by data that does not require HARQ feedback, any resource pool can be selected.

Observation 8 To obtain a Mode-2 grant, the UE first selects a pool and then applies the resource allocation procedure to the selected pool.

RAN2 discusses Mode 2 pool selection restriction, at least, by the HARQ mode required for transmission.
  a. For SL transmissions triggered by data that requires HARQ feedback, a resource pool with PSFCH resource is selected.
  b. For SL transmissions triggered by data that does not require HARQ feedback, any resource pool can be selected.

The following observations have been made in the above discussion:

Observation 1 UE behavior in case of not enough resources for required HARQ retransmissions is unclear.

Observation 2 Without restriction on resource reservation interval selection, the HARQ retransmissions for periodic MAC PDUs might collide.

Observation 3 Without sensing it is useless to have reservation, for both initial transmission and retransmission.

Observation 4 Resource reservation is not necessary in a resource pool dedicated and exclusive for a specific UE.

Observation 5 It may be too late to use the reserved resources for initial transmission if the services require very low latency.

Observation 6 It is unclear if multiple resource pools can be configured in a single carrier for SL transmission.

Observation 7 To enable HARQ feedback transmission, the selected resource pool must be configured with PSFCH resource.

Observation 8 To obtain a Mode-2 grant, the UE first selects a pool and then applies the resource allocation procedure to the selected pool.

Based on the description herein and the above observations, the inventors have proposed the following inventive concepts:

Proposal 1 RAN2 discusses the UE behavior in case of not enough resources for the required number of HARQ retransmissions considering the following alternatives:
  a. Do not select resources for any HARQ retransmission
  b. Select resources for as many HARQ retransmissions as possible Proposal 2 The selected resource reservation interval is larger than the selection window duration, i.e., T2−T1.

Proposal 3 Resource reservation should be disabled for the pools where sensing is not used, i.e. exceptional pool.

Proposal 4 Resource reservation of initial transmission could be disabled for services requiring low latency.

Proposal 5 RAN2 discusses Mode 2 pool selection restriction, at least, by the HARQ mode required for transmission.
  a. For SL transmissions triggered by data that requires HARQ feedback, a resource pool with PSFCH resource is selected.
  b. For SL transmissions triggered by data that does not require HARQ feedback, any resource pool can be selected.

Operations of the communication device 300 (implemented using the structure of the block diagram of FIG. 7) will now be discussed with reference to the flow chart of FIG. 8 according to some embodiments of inventive concepts. For example, modules may be stored in memory 305 of FIG. 7, and these modules may provide instructions so that when the instructions of a module are executed by respective communication device processing circuitry 303, processing circuitry 303 performs respective operations of the flow chart.

At block 8011, processing circuitry 303 selects a resource (e.g., a slot) within a resource selection window (also referred to as a scheduling window) for an initial transmission of a first Medium Access Control MAC protocol data unit PDU of a plurality of periodic MAC PDUs to be transmitted by the first communication device (TX UE) over a device-to-device D2D link (e.g., a SideLink SL) to a second communication device (RX UE). According to some embodiments of FIG. 8, the resource selection window is indicated from a physical protocol layer of the first communication device.

At block 8031, processing circuitry 303 selects a period (P) for the periodic transmission of the plurality of periodic MAC PDUs so that initial transmissions of all MAC PDUs of the plurality of periodic MAC PDUs other than the first MAC PDU occur in resources after the resource selection window.

According to some embodiments of FIG. 8, the period (P) is at least as long as a duration of the resource selection window. According to some other embodiments of FIG. 8, the resource selection window is bounded by a first slot having a first slot number (T1) and a second slot having a second slot number (T2) greater than the first slot number, and the period (P) is defined by a number of slots that is greater than the difference (T2−T1) between the second slot number and the first slot number. According to still other embodiments of FIG. 8, the resource selection window is bounded by a first slot having a first slot number (T1) and a second slot having a second slot number (T2) greater than the first slot number, and the period (P) is defined by a number of slots that is at least as great as the second slot number (T2).

Operations of the communication device 300 (implemented using the structure of the block diagram of FIG. 7) will now be discussed with reference to the flow chart of FIG. 9 according to some embodiments of inventive concepts. For example, modules may be stored in memory 305 of FIG. 7, and these modules may provide instructions so that when the instructions of a module are executed by respective communication device processing circuitry 303, processing circuitry 303 performs respective operations of the flow chart.

At block 9011, processing circuitry 303 selects a resource (e.g., a slot) for an initial transmission of a first Medium Access Control MAC protocol data unit PDU of a plurality of periodic MAC PDUs to be transmitted by the first communication device (TX UE) over a device-to-device D2D link (e.g., a SideLink SL) to a second communication device (RX UE).

At block 9031, processing circuitry 303 selects a period for the periodic transmission of the plurality of periodic MAC PDUs, so that a resource (e.g., a slot) for an initial transmission of a second MAC PDU of the plurality of periodic MAC PDUs is determined based on the period.

At block 9051, processing circuitry 303 selects a plurality of resources (e.g., slots) for retransmissions of the first MAC PDU so that all retransmissions of the first MAC PDU occur before the resource for the initial transmission of the second MAC PDU.

According to some embodiments of FIG. 9, the resource for the initial transmission of the first MAC PDU and the resource for the initial transmission of the second MAC PDU are included in a same resource selection window (also referred to as a scheduling window) that may be indicated from a physical protocol layer of the first communication device.

Operations of the communication device 300 (implemented using the structure of the block diagram of FIG. 7) will now be discussed with reference to the flow chart of FIG. 10 according to some embodiments of inventive concepts. For example, modules may be stored in memory 305 of FIG. 7, and these modules may provide instructions so that when the instructions of a module are executed by respective communication device processing circuitry 303, processing circuitry 303 performs respective operations of the flow chart.

At block 10011, processing circuitry 303 selects respective resources (e.g., slots) for initial transmissions of a plurality of MAC PDUs to be transmitted by the first communication device (TX UE) over a device-to-device D2D link (e.g., a SideLink SL) to a second communication device (RX UE).

At block 10031, processing circuitry 303 determines whether sufficient resources are available for a first retransmission of a first MAC PDU of the plurality of MAC PDUs after selecting the respective resources for the initial transmissions of the plurality of MAC PDUs.

At block 10051, processing circuitry 303 selects respective resources (e.g., slots) for first retransmissions of the plurality of MAC PDUs responsive to determining that sufficient resources are available for a first retransmission of the first MAC PDU.

According to some embodiments of FIG. 10, selecting the respective resources for initial transmissions of the plurality of MAC PDUs may include selecting a resource (e.g., slot) within a scheduling window for an initial transmission of the first MAC PDU, and determining whether sufficient resources are available for a first retransmission of the first MAC PDU may include determining whether sufficient resources are available in the scheduling window for a first retransmission of the first MAC PDU.

According to some embodiments of FIG. 10, the plurality of MAC PDUs may be a plurality of periodic MAC PDUs, and selecting the respective resources may include selecting the respective resources based on a transmission period for the plurality of periodic MAC PDUs.

Operations of the communication device 300 (implemented using the structure of the block diagram of FIG. 7) will now be discussed with reference to the flow chart of FIG. 11 according to some embodiments of inventive concepts. For example, modules may be stored in memory 305 of FIG. 7, and these modules may provide instructions so that when the instructions of a module are executed by respective communication device processing circuitry 303, processing circuitry 303 performs respective operations of the flow chart.

At block 11011, processing circuitry 303 selects a resource (e.g., slot) within a resource selection window (also referred to as a scheduling window) for an initial transmission of a Medium Access Control MAC protocol data unit PDU to be transmitted by the first communication device (TX UE) over a device-to-device D2D link (e.g., a SideLink SL) to a second communication device (RX UE). Moreover, the first communication device is configured to provide up to N retransmissions for a MAC PDU, where N is greater than zero. According to some embodiments of FIG. 11, the resource selection window may be indicated from a physical protocol layer of the first communication device.

At block 11031, processing circuitry 303 determines whether sufficient resources are available for N retransmissions of the MAC PDU in the resource selection window after selecting the resource within the resource selection window for the initial transmission of the MAC PDU.

At block 11051, processing circuitry 303 blocks all retransmission of the MAC PDU responsive to determining that sufficient resources are not available for N retransmissions of the MAC PDU in the resource selection window.

Operations of the communication device 300 (implemented using the structure of the block diagram of FIG. 7) will now be discussed with reference to the flow chart of FIG. 12 according to some embodiments of inventive concepts. For example, modules may be stored in memory 305 of FIG. 7, and these modules may provide instructions so that when the instructions of a module are executed by respective communication device processing circuitry 303, processing circuitry 303 performs respective operations of the flow chart.

At block 12011, processing circuitry 303 selects a resource (e.g., a slot) within a resource selection window (also referred to as a scheduling window) for an initial transmission of a Medium Access Control MAC protocol data unit PDU to be transmitted by the first communication device (TX UE) over a device-to-device D2D link (e.g., a SideLink SL) to a second communication device (RX UE), wherein the first communication device is configured to provide up to N retransmissions for a MAC PDU, where N is greater than zero.

At block 12031, processing circuitry 303 determines that resources are available for only M retransmissions of the MAC PDU in the resource selection window, where M is less than N and M is greater than zero, after selecting the resource within the resource selection window for the initial transmission of the MAC PDU.

At block 12051, processing circuitry 303 limits retransmission of the MAC PDU to M retransmissions responsive to determining that resources are available for only M retransmissions of the MAC PDU in the resource selection window.

Figure 12:
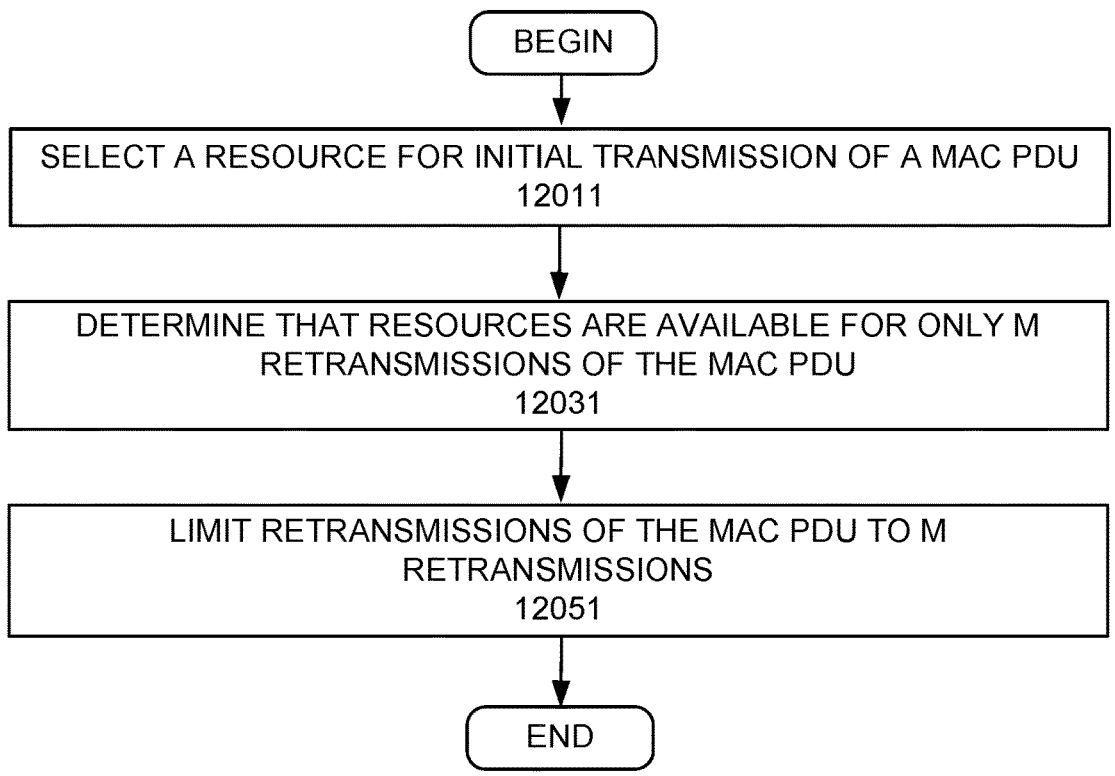

According to some embodiments of FIG. 12, the resource selection window is indicated from a physical protocol layer of the first communication device.

Operations of the communication device 300 (implemented using the structure of the block diagram of FIG. 7) will now be discussed with reference to the flow chart of FIG. 13 according to some embodiments of inventive concepts. For example, modules may be stored in memory 305 of FIG. 7, and these modules may provide instructions so that when the instructions of a module are executed by respective communication device processing circuitry 303, processing circuitry 303 performs respective operations of the flow chart.

At block 13011, processing circuitry 303 selects a resource (e.g., a slot) within a resource selection window (also referred to as a scheduling window) for an initial transmission of a Medium Access Control MAC protocol data unit PDU to be transmitted by the first communication device (TX UE) over a device-to-device D2D link (e.g., a SideLink SL) to a second communication device (RX UE), wherein the first communication device is configured to provide up to N retransmissions for each of the plurality of periodic MAC PDUs, where N is greater than zero. According to some embodiments of FIG. 13, the resource selection window is indicated from a physical protocol layer of the first communication device.

At block 13021, processing circuitry 303 determines that resources are available for only M retransmissions of the MAC PDU in the resource selection window, where M is less than N and M is greater than zero after selecting the resource within the resource selection window for the initial transmission of the MAC PDU.

At block 13031, processing circuitry 303 selects M resources (e.g., slots) of the resource selection window for retransmissions of the of the MAC PDU responsive to determining that resources are available for only M retransmissions of the MAC PDU in the resource selection window.

At block 13041, processing circuitry 303 transmits respective retransmissions of the MAC PDU in each of the M slots of the resource selection window.

At block 13051, processing circuitry 303 selects N-M resources (e.g., slots) after the resource selection window for retransmission of the MAC PDU.

At block 13061, processing circuitry 303 transmits a retransmission of the MAC PDU in at least one of the N-M resources after the resource selection window.

According to some embodiments of FIG. 13, the respective retransmissions of the MAC PDU may be transmitted in each of the M resources of the resource selection window responsive to respective NACKs received from the second communication device, and the retransmission of the MAC PDU may be retransmitted in the at least one of the N-M resources responsive to a respective NACK received from the second communication device after transmitting the respective retransmissions of the MAC PDU in each of the M resources.

Figure 14:
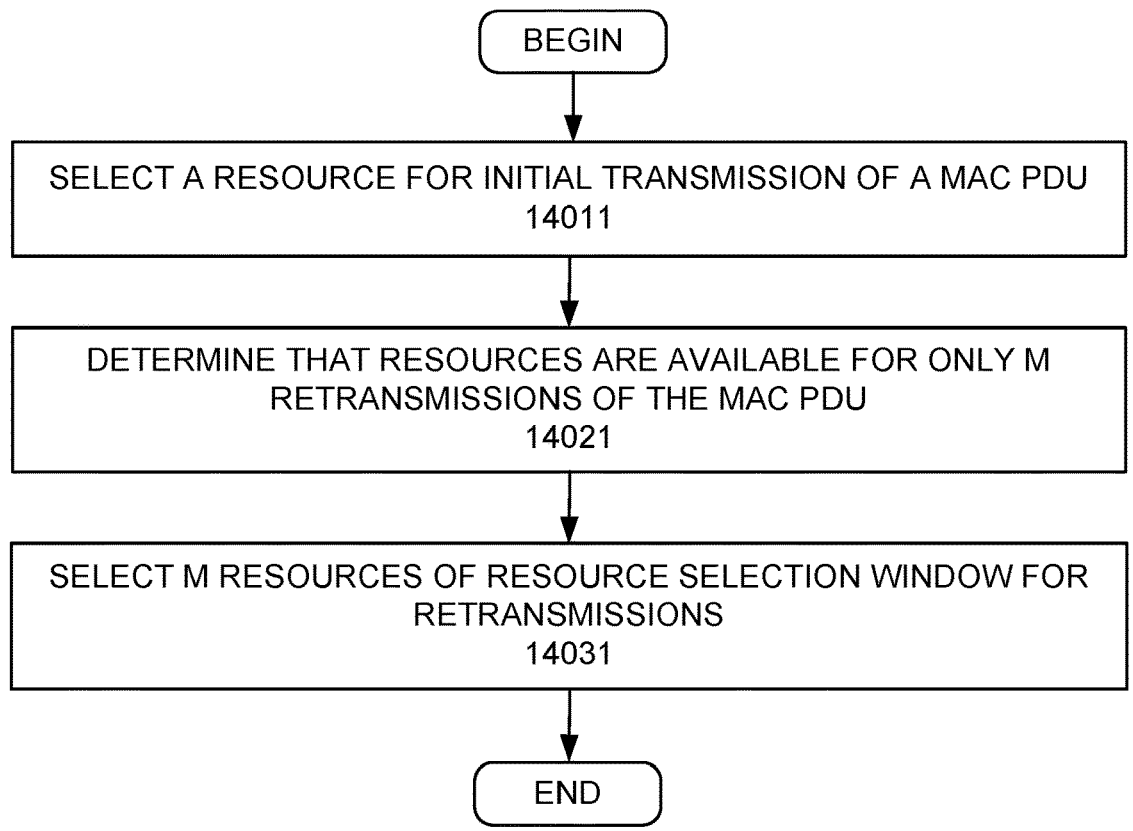

Operations of the communication device 300 (implemented using the structure of the block diagram of FIG. 7) will now be discussed with reference to the flow chart of FIG. 14 according to some embodiments of inventive concepts. For example, modules may be stored in memory 305 of FIG. 7, and these modules may provide instructions so that when the instructions of a module are executed by respective communication device processing circuitry 303, processing circuitry 303 performs respective operations of the flow chart.

At block 14011, processing circuitry 303 selects a resource (e.g., a slot) within a resource selection window (also referred to as a scheduling window) for an initial transmission of a Medium Access Control MAC protocol data unit PDU to be transmitted by the first communication device (TX UE) over a device-to-device D2D link (e.g., a SideLink SL) to a second communication device (RX UE), wherein the first communication device is configured to provide up to N retransmissions for each of the plurality of periodic MAC PDUs, where N is greater than zero. According to some embodiments of FIG. 14, the resource selection window is indicated from a physical protocol layer of the first communication device.

At block 14021, processing circuitry 303 determines that resources are available for only M retransmissions of the MAC PDU in the resource selection window, where M is less than N and M is greater than zero, after selecting the resource within the resource selection window for the initial transmission of the MAC PDU.

At block 14031, processing circuitry 303 selects M resources (e.g., slots) of the resource selection window for retransmissions of the of the MAC PDU, responsive to determining that resources are available for only M retransmissions of the MAC PDU in the resource selection window.

According to some embodiments herein, a resource may include on slot or a plurality of slots, and/or a MAC PDU may be a transport block.

Example embodiments are discussed below.

1. A method of operating a first communication device (TX UE), the method comprising:
    selecting (8011) a resource within a resource selection window for an initial transmission of a first Medium Access Control, MAC, protocol data unit, PDU, of a plurality of periodic MAC PDUs to be transmitted by the first communication device (TX UE) over a device-to-device, D2D, link to a second communication device (RX UE); and
    selecting (8031) a period (P) for the periodic transmission of the plurality of periodic MAC PDUs so that initial transmissions of all MAC PDUs of the plurality of periodic MAC PDUs other than the first MAC PDU occur in resources after the resource selection window.
2. The method of Embodiment 1, wherein the resource comprises at least one slot.
3. The method of and of Embodiments 1-2, wherein the period (P) is at least as long as a duration of the resource selection window.
4. The method of Embodiment 1-2, wherein the resource selection window is bounded by a first slot having a first slot number (T1) and a second slot having a second slot number (T2) greater than the first slot number, and wherein the period (P) is defined by a number of slots that is greater than the difference (T2−T1) between the second slot number and the first slot number.
5. The method of Embodiment 1-2, wherein the resource selection window is bounded by a first slot having a first slot number (T1) and a second slot having a second slot number (T2) greater than the first slot number, and wherein the period (P) is defined by a number of slots that is at least as great as the second slot number (T2).
6. The method of any of Embodiments 1-5 further comprising:
    transmitting the initial transmission of the first MAC PDU over the D2D link to the second communication device using the resource selected within the resource selection window.
7. The method of any of Embodiments 1-6 further comprising:
    transmitting sidelink control information, SCI, indicating the initial transmission of the first MAC PDU over the D2D link to the second communication device, wherein the SCI indicates use of the resource selected within the resource selection window.

8. The method of any of Embodiments 1-7 further comprising:
   selecting a resource after the resource selection window for an initial transmission of a second MAC PDU of the plurality of periodic MAC PDUs, wherein the resource after the resource selection window is selected based on the period; and
   transmitting the initial transmission of the second MAC PDU of the plurality of periodic MAC PDUs over the D2D link using the resource after the resource selection window.

9. The method of any of Embodiments 1-8 further comprising:
   selecting a plurality of resources for retransmissions of the first MAC PDU within the resource selection window; and
   transmitting a retransmission of the first MAC PDU over the D2D link to the second communication device using a first one of the plurality of resources for retransmission.

10. The method of any of Embodiments 1-8 further comprising:
    receiving a NACK from the second communication device, wherein the NACK corresponds to the initial transmission of the first MAC PDU;
    responsive to receiving the NACK, selecting a resource for retransmission of the first MAC PDU within the resource selection window; and
    transmitting a retransmission of the MAC PDU over the D2D link to the second communication device using the resource selected for retransmission of the first MAC PDU within the resource selection window.

11. The method of any of Embodiments 6-10, wherein all resources for retransmissions of the first MAC PDU are restricted to the resource selection window.

12. The method of any of Embodiments 1-8, wherein the first communication device is configured to provide up to N retransmissions for each of the plurality of periodic MAC PDUs, where N is greater than zero, the method further comprising:
    after selecting the resource within the resource selection window for the initial transmission of the first MAC PDU, determining whether sufficient resources are available for N retransmissions of the first MAC PDU in the resource selection window; and
    responsive to determining that sufficient resources are not available for N retransmissions of the first MAC PDU in the resource selection window, blocking all retransmission of the first MAC PDU.

13. The method of any of Embodiments 1-8, wherein the first communication device is configured to provide up to N retransmissions for each of the plurality of periodic MAC PDUs, where N is greater than zero, the method further comprising:
    after selecting the resource within the resource selection window for the initial transmission of the first MAC PDU, determining that resources are available for only M retransmissions of the first MAC PDU in the resource selection window, where M is less than N and M is greater than zero; and
    responsive to determining that resource are available for only M retransmissions of the first MAC PDU in the resource selection window, limiting retransmission of the first MAC PDU to M retransmissions.

14. The method of any of Embodiments 1-8, wherein the first communication device is configured to provide up to N retransmissions for each of the plurality of periodic MAC PDUs, where N is greater than zero, the method further comprising:
    after selecting the resource within the resource selection window for the initial transmission of the first MAC PDU, determining that resources are available for only M retransmissions of the first MAC PDU in the resource selection window, where M is less than N and M is greater than zero; and
    responsive to determining that resources are available for only M retransmissions of the first MAC PDU in the resource selection window, selecting M resources of the resource selection window for retransmissions of the first MAC PDU.

15. The method of Embodiment 14 further comprising:
    transmitting at least one retransmission of the first MAC PDU in at least one of the M resources of the resource selection window.

16. The method of Embodiment 15, wherein the at least one retransmission of the first MAC PDU is transmitted responsive to a NACK received from the second communication device.

17. The method of Embodiment 14 further comprising:
    transmitting respective retransmissions of the first MAC PDU in each of the M resources of the resource selection window;
    selecting N-M resources occurring after the resource selection window for retransmission of the first MAC PDU; and
    transmitting a retransmission of the first MAC PDU in at least one of the N-M resources after the resource selection window.

18. The method of Embodiment 17, wherein the N-M resources are selected after transmitting the respective retransmissions of the first MAC PDU in each of the M resources of the resource selection window.

19. The method of any of Embodiments 17-18, wherein the N-M resources are selected after selecting the M resources.

20. The method of any of Embodiments 17-19, wherein the respective retransmissions of the first MAC PDU are transmitted in each of the M resources responsive to respective NACKs received from the second communication device, and wherein the retransmission of the first MAC PDU is transmitted in at least one of the N-M resources responsive to a respective NACK received from the second communication device after transmitting the respective retransmissions of the first MAC PDU in each of the M slots.

21. The method of any of Embodiments 1-20, wherein the resource selection window is indicated from a physical protocol layer of the first communication device.

22. The method of any of Embodiments 1-21, wherein the D2D link is a SideLink, SL.

23. A method of operating a first communication device (TX UE), the method comprising:
    selecting (9011) a resource for an initial transmission of a first Medium Access Control, MAC, protocol data unit, PDU, of a plurality of periodic MAC PDUs to be transmitted by the first communication device (TX UE) over a device-to-device, D2D, link to a second communication device (RX UE); and
    selecting (9031) a period for the periodic transmission of the plurality of periodic MAC PDUs, so that a resource for an initial transmission of a second MAC PDU of the plurality of periodic MAC PDUs is determined based on the period; and selecting (9051) a plurality of resources for retransmissions of the first MAC PDU so that all retransmissions of the first MAC PDU occur before the resource for the initial transmission of the second MAC PDU.

24. The method of Embodiment 23, wherein the resource comprises at least one slot.

25. The method of any of Embodiments 23-24 further comprising:

transmitting the initial transmission of the first MAC PDU over the D2D link to the second communication device using the resource selected for the initial transmission of the first MAC PDU.

26. The method of any of Embodiments 23-25 further comprising:

transmitting sidelink control information, SCI, indicating the initial transmission of the first MAC PDU over the D2D link to the second communication device, wherein the SCI indicates use of the resource selected for the initial transmission of the first MAC PDU.

27. The method of any of Embodiments 23-26, the method further comprising:

transmitting the initial transmission of the second MAC PDU of the plurality of periodic MAC PDUs over the D2D link using the resource for the initial transmission of the second MAC PDU.

28. The method of any of Embodiments 23-27, wherein the first communication device is configured to provide up to N retransmissions for each of the plurality of periodic MAC PDUs, where N is greater than zero, the method further comprising:

after selecting the resource for the initial transmission of the first MAC PDU, determining whether sufficient resources are available for N retransmissions of the first MAC PDU before the resource for the initial transmission of the second MAC PDU; and responsive to determining that sufficient resources are not available for N retransmissions of the first MAC PDU before the resource for the initial transmission of the second MAC PDU, blocking all retransmission of the first MAC PDU.

29. The method of any of Embodiments 23-27, wherein the first communication device is configured to provide up to N retransmissions for each of the plurality of periodic MAC PDUs, where N is greater than zero, the method further comprising:

after selecting the resource for the initial transmission of the first MAC PDU, determining that resources are available for only M retransmissions of the first MAC PDU before the resource for the initial transmission of the second MAC PDU; and responsive to determining that resources are available for only M retransmissions of the first MAC PDU before the resource for the initial transmission of the second MAC PDU, limiting retransmission of the first MAC PDU to M retransmissions.

30. The method of any of Embodiments 23-27, wherein the first communication device is configured to provide up to N retransmissions for each of the plurality of periodic MAC PDUs, where N is greater than zero, the method further comprising:

after selecting the resource for the initial transmission of the first MAC PDU, determining that resources are available for only M retransmissions of the first MAC PDU before the resource for the initial transmission of the second MAC PDU, where M is less than N and M is greater than zero;

responsive to determining that resources are available for only M retransmissions of the first MAC PDU before the resource for the initial transmission of the second MAC PDU, selecting M resources before the resource for the initial transmission of the second MAC PDU for retransmissions of the first MAC PDU.

31. The method of any of Embodiments 23-30 further comprising:

transmitting a retransmission of the first MAC PDU over the D2D link to the second communication device using a first one of the plurality of resources for retransmission responsive to receiving a NACK from the second communication device.

32. The method of any of Embodiments 23-31, wherein the resource for the initial transmission of the first MAC PDU and the resource for the initial transmission of the second MAC PDU are included in a same resource selection window.

33. The method of Embodiment 32, wherein the resource selection window is indicated from a physical protocol layer of the first communication device.

34. The method of any of Embodiments 23-33, wherein the D2D link is a SideLink, SL.

35. A method of operating a first communication device (TX UE), the method comprising:

selecting (10011) respective resources for initial transmissions of a plurality of MAC PDUs to be transmitted by the first communication device (TX UE) over a device-to-device, D2D, link to a second communication device (RX UE);

after selecting the respective resources for the initial transmissions of the plurality of MAC PDUs, determining (10031) whether sufficient resources are available for a first retransmission of a first MAC PDU of the plurality of MAC PDUs; and responsive to determining that sufficient resources are available for a first retransmission of the first MAC PDU, selecting (10051) respective resources for the first retransmission of the plurality of MAC PDUs.

36. The method of Embodiment 35, wherein each of the respective resources comprises at least one slot.

37. The method of any of Embodiments 35-36 further comprising:

after selecting the respective resources for the first retransmissions of the plurality of MAC PDUs, determining whether sufficient resources are available for a second retransmission of the first MAC PDU of the plurality of MAC PDUs; and responsive to determining that sufficient resources are not available for a second retransmission of the first MAC PDU, limiting retransmissions for of the plurality of MAC PDUs to only one retransmission.

38. The method of any of Embodiments 35-36 further comprising:

after selecting the respective resources for the first retransmissions of the plurality of MAC PDUs, determining whether sufficient resources are available for a second retransmission of the first MAC PDU of the plurality of MAC PDUs; and responsive to determining that sufficient resources are not available for a second retransmission of the first MAC PDU, blocking all retransmissions for of the plurality of MAC PDUs.

39. The method of any of Embodiments 37-38, wherein selecting the respective resources for initial transmissions of the plurality of MAC PDUs comprises selecting a resource within a scheduling window for an initial transmission of the first MAC PDU, wherein determining whether sufficient resources are available for a first retransmission of the first MAC PDU comprises determining whether sufficient resources are available in the scheduling window for a first retransmission of the first MAC PDU, and wherein determining whether sufficient resources are available for a second retransmission of the first MAC PDU comprises determining whether sufficient resources are available in the scheduling window for a second retransmission of the first MAC PDU.
40. The method of any of any of Embodiments 35-38, wherein selecting the respective resources for initial transmissions of the plurality of MAC PDUs comprises selecting a resource within a scheduling window for an initial transmission of the first MAC PDU, wherein determining whether sufficient resources are available for a first retransmission of the first MAC PDU comprises determining whether sufficient resources are available in the scheduling window for a first retransmission of the first MAC PDU.
41. The method of any of Embodiments 35-40, wherein the first communication device is configured to provide up to N retransmissions for each of the plurality of MAC PDUs, where N is greater than one.
42. The method of any of Embodiments 35-41 further comprising:
    transmitting the initial transmission of the first MAC PDU over the D2D link to the second communication device using the respective resource selected for the first MAC PDU of the plurality of MAC PDUs.
43. The method of Embodiment 42 further comprising:
    responsive to receiving a NACK from the second communication device after the initial transmission of the first MAC PDU, transmitting a first retransmission of the first MAC PDU using the respective resource for the first retransmission of the first MAC PDU of the plurality of MAC PDUs.
44. The method of Embodiment 43 further comprising:
    responsive to receiving a NACK from the second communication device after the first retransmission of the first MAC PDU, omitting further retransmission of the first MAC PDU based on limiting retransmissions to only one retransmission.
45. The method of any of Embodiments 35-44 further comprising:
    transmitting sidelink control information, SCI, indicating the initial transmission of the first MAC PDU over the D2D link to the second communication device, wherein the SCI indicates use of the resource selected.
46. The method of any of Embodiments 35-45, wherein the D2D link is a SideLink, SL.
47. The method of any of Embodiments 35-46, wherein the plurality of MAC PDUs is a plurality of periodic MAC PDUs, and wherein selecting the respective resources comprises selecting the respective resources based on a transmission period for the plurality of periodic MAC PDUs.
48. A method of operating a first communication device (TX UE), the method comprising:
    selecting (11011) a resource within a resource selection window for an initial transmission of a Medium Access Control, MAC, protocol data unit, PDU, to be transmitted by the first communication device (TX UE) over a device-to-device, D2D, link to a second communication device (RX UE), wherein the first communication device is configured to provide up to N retransmissions for a MAC PDU, where N is greater than zero;
    after selecting the resource within the resource selection window for the initial transmission of the MAC PDU, determining (11031) whether sufficient resources are available for N retransmissions of the MAC PDU in the resource selection window; and
    responsive to determining that sufficient resources are not available for N retransmissions of the MAC PDU in the resource selection window, blocking (11051) all retransmission of the MAC PDU.
49. The method of Embodiment 48, wherein the resource comprises at least one slot.
50. The method of any of Embodiments 48-49 further comprising:
    transmitting the initial transmission of the MAC PDU over the D2D link to the second communication device using the resource selected within the resource selection window.
51. The method of any of Embodiments 48-50 further comprising:
    transmitting sidelink control information, SCI, indicating the initial transmission of the MAC PDU over the D2D link to the second communication device, wherein the SCI indicates use of the resource selected within the resource selection window.
52. The method of any of Embodiments 48-51, wherein the resource selection window is indicated from a physical protocol layer of the first communication device.
53. The method of any of Embodiments 48-52, wherein the D2D link is a SideLink, SL.
54. A method of operating a first communication device (TX UE), the method comprising:
    selecting (12011) a resource within a resource selection window for an initial transmission of a Medium Access Control, MAC, protocol data unit, PDU, to be transmitted by the first communication device (TX UE) over a device-to-device, D2D, link to a second communication device (RX UE), wherein the first communication device is configured to provide up to N retransmissions for a MAC PDU, where N is greater than zero;
    after selecting the resource within the resource selection window for the initial transmission of the MAC PDU, determining (12031) that resources are available for only M retransmissions of the MAC PDU in the resource selection window, where M is less than N and M is greater than zero; and
    responsive to determining that resources are available for only M retransmissions of the MAC PDU in the resource selection window, limiting (12051) retransmission of the MAC PDU to M retransmissions.
55. The method of Embodiment 54, wherein the resource comprises at least one slot.
56. The method of any of Embodiments 54-55 further comprising:
    transmitting the initial transmission of the MAC PDU over the D2D link to the second communication device using the resource selected within the resource selection window.

57. The method of any of Embodiments 54-56 further comprising:
   transmitting sidelink control information, SCI, indicating the initial transmission of the MAC PDU over the D2D link to the second communication device, wherein the SCI indicates use of the resource selected within the resource selection window.
58. The method of any of Embodiments 54-57, wherein the resource selection window is indicated from a physical protocol layer of the first communication device.
59. The method of any of Embodiments 54-58, wherein the D2D link is a SideLink, SL.
60. A method of operating a first communication device (TX UE), the method comprising:
   selecting (13011) a resource within a resource selection window for an initial transmission of a Medium Access Control, MAC, protocol data unit, PDU, to be transmitted by the first communication device (TX UE) over a device-to-device, D2D, link to a second communication device (RX UE), wherein the first communication device is configured to provide up to N retransmissions for each of the plurality of periodic MAC PDUs, where N is greater than zero;
   after selecting the resource within the resource selection window for the initial transmission of the MAC PDU, determining (13021) that resources are available for only M retransmissions of the MAC PDU in the resource selection window, where M is less than N and M is greater than zero; and
   responsive to determining that resources are available for only M retransmissions of the MAC PDU in the resource selection window, selecting (13031) M resources of the resource selection window for retransmissions of the of the MAC PDU.
61. The method of Embodiment 60, wherein the resource comprises at least one slot, and wherein each of the M resources comprises at least one slot.
62. The method of any of Embodiments 60-61 further comprising:
   transmitting at least one retransmission of the MAC PDU in at least one of the M resources of the resource selection window.
63. The method of Embodiment 62, wherein the at least one retransmission of the MAC PDU is transmitted responsive to a NACK received from the second communication device.
64. The method of any of Embodiments 60-61 further comprising:
   transmitting (13041) respective retransmissions of the MAC PDU in each of the M resources of the resource selection window;
   selecting (13051) N-M resources after the resource selection window for retransmission of the MAC PDU; and
   transmitting (13061) a retransmission of the MAC PDU in at least one of the N-M resources after the resource selection window.
65. The method of Embodiment 64, wherein the respective retransmissions of the MAC PDU are transmitted in each of the M resources of the resource selection window responsive to respective NACKs received from the second communication device, and wherein the retransmission of the MAC PDU is retransmitted in the at least one of the N-M resources responsive to a respective NACK received from the second communication device after transmitting the respective retransmissions of the MAC PDU in each of the M resources.
66. The method of any of Embodiments 64-65, wherein the N-M resources are selected after transmitting the respective retransmissions of the MAC PDU in each of the M resources of the resource selection window.
67. The method of any of Embodiments 64-66, wherein the N-M resources are selected after selecting the M resources.
68. The method of any of Embodiments 60-67 further comprising:
   transmitting the initial transmission of the MAC PDU over the D2D link to the second communication device using the resource selected within the resource selection window.
69. The method of any of Embodiments 60-68 further comprising:
   transmitting sidelink control information, SCI, indicating the initial transmission of the MAC PDU over the D2D link to the second communication device, wherein the SCI indicates use of the resource selected within the resource selection window.
70. The method of any of Embodiments 60-69, wherein the resource selection window is indicated from a physical protocol layer of the first communication device.
71. The method of any of Embodiments 60-70, wherein the D2D link is a SideLink, SL.
72. A first communication device (300) comprising:
   a processor (303); and
   memory (305) coupled with the processor, wherein the memory includes instructions that when executed by the processor causes the first communication device to perform operations according to any of Embodiments 1-71.
73. A communication device (300) wherein the communication device (300) is adapted to perform according to any of Embodiments 1-71.
74. A computer program comprising program code to be executed by at least one processor (303) of a communication device (300), whereby execution of the program code causes the communication device (300) to perform operations according to any one of embodiments 1-71.
75. A computer program product comprising a non-transitory storage medium including program code to be executed by at least one processor (303) of a communication device (300), whereby execution of the program code causes the communication device (300) to perform operations according to any one of embodiments 1-71.

Explanations are provided below for various abbreviations/acronyms used in the present disclosure.

| Abbreviation | Explanation |
| --- | --- |
| 3GPP | Third Generation Partnership Project |
| 5G | 5th Generation |
| ACK | Acknowledgement |
| ARQ | Automatic Repeat Request |
| CDMA | Code Division Multiplexing Access |
| C-ITS | Cellular Intelligent Transport Systems |
| DCI | Downlink Control Information |
| D2D | Device-to-Device |
| eNB | E-UTRAN NodeB |
| E-UTRAN | Evolved UTRAN |
| FFS | For Further Study |

-continued

| Abbreviation | Explanation |
| --- | --- |
| gNB | Base station in NR |
| GSM | Global System for Mobile communication |
| HARQ | Hybrid Automatic Repeat Request |
| IP | Internet Protocol |
| ITS | Intelligent Transport Systems |
| LCH | Logical Channel Group |
| LCP | Link Control Protocol |
| LTE | Long Term Evolution |
| MAC | Medium Access Control |
| MDT | Minimization of Drive Tests |
| MSC | Mobile Switching Center |
| NACK | Negative Acknowledgement |
| NR | New Radio |
| NW | Network |
| O&M | Operation and Maintenance |
| OEM | Original Equipment Manufacture |
| PDB | Packet Delay Budget |
| PDU | Packet Data Unit |
| QoS | Quality of service |
| RA | Resource Allocation |
| PSFCH | Physical Sidelink Feedback Channel |
| PSCCH | Physical Sidelink Control Channel |
| PSSCH | Physical Sidelink Shared Channel |
| PUSCH | Physical Uplink Shared Channel |
| PUCCH | Physical Uplink Control Channel |
| PHY | Physical |
| RA | Resource Allocation |
| RAN | Radio Access Network |
| RAT | Radio Access Technology |
| RNC | Radio Network Controller |
| RRC | Radio Resource Control |
| SA | Scheduling Assignment |
| SCI | Sidelink Control Information |
| SCS | Subcarrier Spacing |
| SL | Sidelink |
| TB | Transport Block |
| UE | User Equipment |
| UMTS | Universal Mobile Telecommunication System |
| UTRAN | Universal Terrestrial Radio Access Network |
| WCDMA | Wide CDMA |
| WI | Work Item |
| WLAN | Wide Local Area Network |
| V2X | Vehicle-to-Everything |

References are identified below.
[1] TS 36.331, V15.5.1, "Radio Resource Control (RRC); Protocol specification (Release 15)"
[2] R1-1908913, Resource allocation for Mode-2 transmissions, Ericsson, 3GPP RAN1 #98 meeting, Prague, October 2019.
[3] R2-1906495, Summary of 105bis #31 NR V2X Resource pool configuration and selection (ZTE)
[4] R2-1915272, Support on HARQ procedure over sidelink, 3GPP TSG RAN2 Meeting #108, November 2019

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 15:
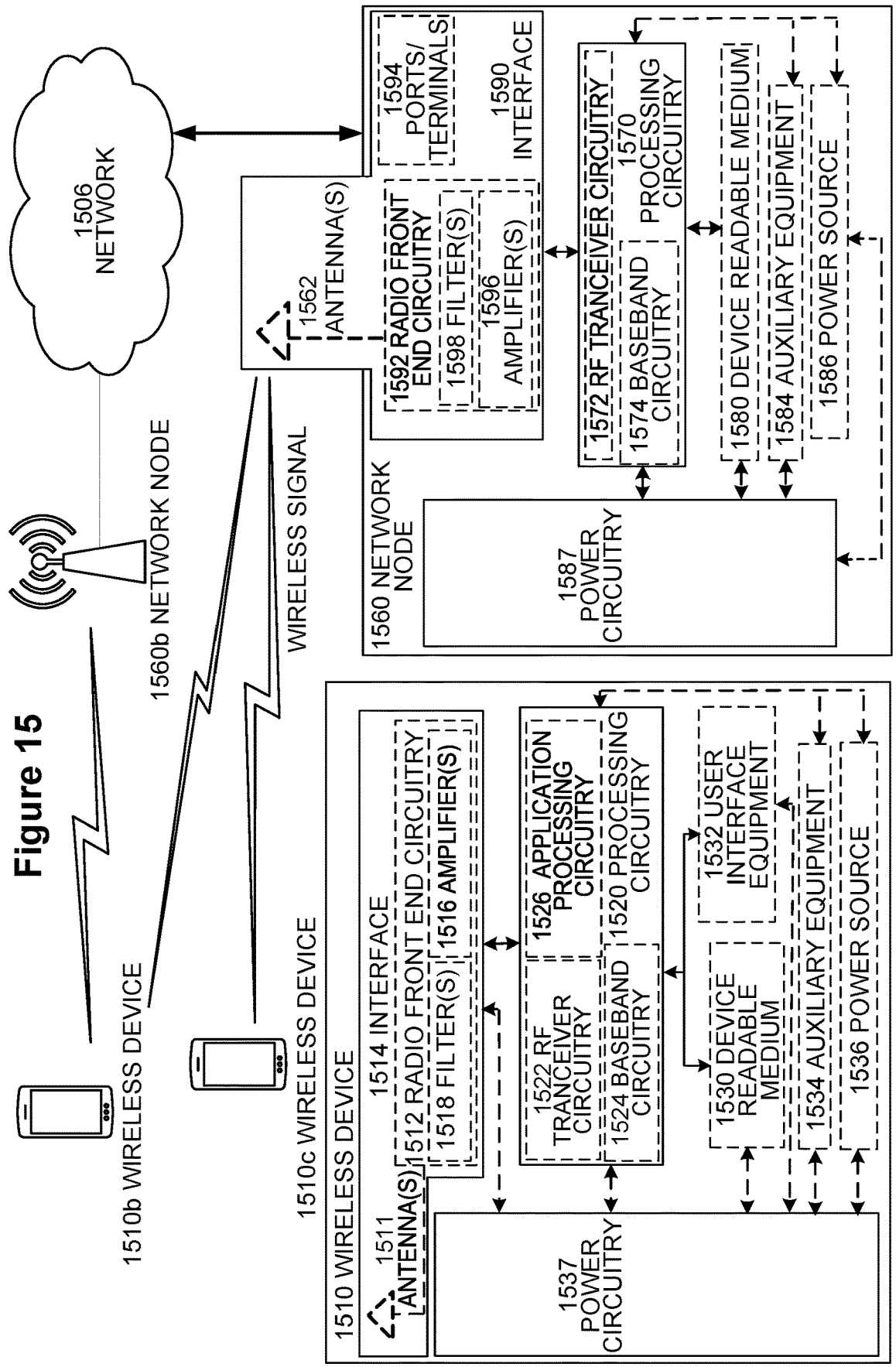
FIG. 15 is a block diagram of a wireless network in accordance with some embodiments.

FIG. 15 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 15. For simplicity, the wireless network of FIG. 15 only depicts network 1506, network nodes 1560 and 1560b, and WDs 1510, 1510b, and 1510c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 1560 and wireless device (WD) 1510 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1506 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1560 and WD 1510 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 15, network node 1560 includes processing circuitry 1570, device readable medium 1580, interface 1590, auxiliary equipment 1584, power source 1586, power circuitry 1587, and antenna 1562. Although network node 1560 illustrated in the example wireless network of FIG. 15 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1560 are depicted as single boxes located within a larger box, or nested within multiple boxes, in practice, a network node may comprise multiple different physical components that make up a single illustrated component (e.g., device readable medium 1580 may comprise multiple separate hard drives as well as multiple RAM modules).

Similarly, network node 1560 may be composed of multiple physically separate components (e.g., a NodeB component and a RNC component, or a BTS component and a BSC component, etc.), which may each have their own respective components. In certain scenarios in which network node 1560 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1560 may be configured to support multiple radio access technologies (RATs). In such embodiments, some components may be duplicated (e.g., separate device readable medium 1580 for the different RATs) and some components may be reused (e.g., the same antenna 1562 may be shared by the RATs). Network node 1560 may also include multiple sets of the various illustrated components for different wireless technologies integrated into network node 1560, such as, for example, GSM, WCDMA, LTE, NR, WiFi, or Bluetooth wireless technologies. These wireless technologies may be integrated into the same or different chip or set of chips and other components within network node 1560.

Processing circuitry 1570 is configured to perform any determining, calculating, or similar operations (e.g., certain obtaining operations) described herein as being provided by a network node. These operations performed by processing circuitry 1570 may include processing information obtained by processing circuitry 1570 by, for example, converting the obtained information into other information, comparing the obtained information or converted information to information stored in the network node, and/or performing one or more operations based on the obtained information or converted information, and as a result of said processing making a determination.

Processing circuitry 1570 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1560 components, such as device readable medium 1580, network node 1560 functionality. For example, processing circuitry 1570 may execute instructions stored in device readable medium 1580 or in memory within processing circuitry 1570. Such functionality may include providing any of the various wireless features, functions, or benefits discussed herein. In some embodiments, processing circuitry 1570 may include a system on a chip (SOC).

In some embodiments, processing circuitry 1570 may include one or more of radio frequency (RF) transceiver circuitry 1572 and baseband processing circuitry 1574. In some embodiments, radio frequency (RF) transceiver circuitry 1572 and baseband processing circuitry 1574 may be on separate chips (or sets of chips), boards, or units, such as radio units and digital units. In alternative embodiments, part or all of RF transceiver circuitry 1572 and baseband processing circuitry 1574 may be on the same chip or set of chips, boards, or units In certain embodiments, some or all of the functionality described herein as being provided by a network node, base station, eNB or other such network device may be performed by processing circuitry 1570 executing instructions stored on device readable medium 1580 or memory within processing circuitry 1570. In alternative embodiments, some or all of the functionality may be provided by processing circuitry 1570 without executing instructions stored on a separate or discrete device readable medium, such as in a hard-wired manner. In any of those embodiments, whether executing instructions stored on a device readable storage medium or not, processing circuitry 1570 can be configured to perform the described functionality. The benefits provided by such functionality are not limited to processing circuitry 1570 alone or to other components of network node 1560, but are enjoyed by network node 1560 as a whole, and/or by end users and the wireless network generally.

Device readable medium 1580 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1570. Device readable medium 1580 may store any suitable instructions, data or information, including a computer program, software, an application including one or more of logic, rules, code, tables, etc. and/or other instructions capable of being executed by processing circuitry 1570 and, utilized by network node 1560. Device readable medium 1580 may be used to store any calculations made by processing circuitry 1570 and/or any data received via interface 1590. In some embodiments, processing circuitry 1570 and device readable medium 1580 may be considered to be integrated.

Interface 1590 is used in the wired or wireless communication of signalling and/or data between network node 1560, network 1506, and/or WDs 1510. As illustrated, interface 1590 comprises port(s)/terminal(s) 1594 to send and receive data, for example to and from network 1506 over a wired connection. Interface 1590 also includes radio front end circuitry 1592 that may be coupled to, or in certain embodiments a part of, antenna 1562. Radio front end circuitry 1592 comprises filters 1598 and amplifiers 1596. Radio front end circuitry 1592 may be connected to antenna 1562 and processing circuitry 1570. Radio front end circuitry may be configured to condition signals communicated between antenna 1562 and processing circuitry 1570. Radio front end circuitry 1592 may receive digital data that is to be sent out to other network nodes or WDs via a wireless connection. Radio front end circuitry 1592 may convert the digital data into a radio signal having the appropriate channel and bandwidth parameters using a combination of filters 1598 and/or amplifiers 1596. The radio signal may then be transmitted via antenna 1562. Similarly, when receiving data, antenna 1562 may collect radio signals which are then converted into digital data by radio front end circuitry 1592. The digital data may be passed to processing circuitry 1570. In other embodiments, the interface may comprise different components and/or different combinations of components.

In certain alternative embodiments, network node 1560 may not include separate radio front end circuitry 1592, instead, processing circuitry 1570 may comprise radio front end circuitry and may be connected to antenna 1562 without separate radio front end circuitry 1592. Similarly, in some embodiments, all or some of RF transceiver circuitry 1572 may be considered a part of interface 1590. In still other embodiments, interface 1590 may include one or more ports or terminals 1594, radio front end circuitry 1592, and RF transceiver circuitry 1572, as part of a radio unit (not shown), and interface 1590 may communicate with baseband processing circuitry 1574, which is part of a digital unit (not shown).

Antenna 1562 may include one or more antennas, or antenna arrays, configured to send and/or receive wireless signals. Antenna 1562 may be coupled to radio front end circuitry 1592 and may be any type of antenna capable of transmitting and receiving data and/or signals wirelessly. In some embodiments, antenna 1562 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1562 may be separate from network node 1560 and may be connectable to network node 1560 through an interface or port.

Antenna 1562, interface 1590, and/or processing circuitry 1570 may be configured to perform any receiving operations and/or certain obtaining operations described herein as being performed by a network node. Any information, data and/or signals may be received from a wireless device, another network node and/or any other network equipment. Similarly, antenna 1562, interface 1590, and/or processing circuitry 1570 may be configured to perform any transmitting operations described herein as being performed by a network node. Any information, data and/or signals may be transmitted to a wireless device, another network node and/or any other network equipment.

Power circuitry 1587 may comprise, or be coupled to, power management circuitry and is configured to supply the components of network node 1560 with power for performing the functionality described herein. Power circuitry 1587 may receive power from power source 1586. Power source 1586 and/or power circuitry 1587 may be configured to provide power to the various components of network node 1560 in a form suitable for the respective components (e.g., at a voltage and current level needed for each respective component). Power source 1586 may either be included in, or external to, power circuitry 1587 and/or network node 1560. For example, network node 1560 may be connectable to an external power source (e.g., an electricity outlet) via an input circuitry or interface such as an electrical cable, whereby the external power source supplies power to power circuitry 1587. As a further example, power source 1586 may comprise a source of power in the form of a battery or battery pack which is connected to, or integrated in, power circuitry 1587. The battery may provide backup power should the external power source fail. Other types of power sources, such as photovoltaic devices, may also be used.

Alternative embodiments of network node 1560 may include additional components beyond those shown in FIG. 15 that may be responsible for providing certain aspects of the network node's functionality, including any of the functionality described herein and/or any functionality necessary to support the subject matter described herein. For example, network node 1560 may include user interface equipment to allow input of information into network node 1560 and to allow output of information from network node 1560. This may allow a user to perform diagnostic, maintenance, repair, and other administrative functions for network node 1560.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1510 includes antenna 1511, interface 1514, processing circuitry 1520, device readable medium 1530, user interface equipment 1532, auxiliary equipment 1534, power source 1536 and power circuitry 1537. WD 1510 may include multiple sets of one or more of the illustrated components for different wireless technologies supported by WD 1510, such as, for example, GSM, WCDMA, LTE, NR, WiFi, WiMAX, or Bluetooth wireless technologies, just to mention a few. These wireless technologies may be integrated into the same or different chips or set of chips as other components within WD 1510.

Antenna 1511 may include one or more antennas or antenna arrays, configured to send and/or receive wireless signals, and is connected to interface 1514. In certain alternative embodiments, antenna 1511 may be separate from WD 1510 and be connectable to WD 1510 through an interface or port. Antenna 1511, interface 1514, and/or processing circuitry 1520 may be configured to perform any receiving or transmitting operations described herein as being performed by a WD. Any information, data and/or signals may be received from a network node and/or another WD. In some embodiments, radio front end circuitry and/or antenna 1511 may be considered an interface.

As illustrated, interface 1514 comprises radio front end circuitry 1512 and antenna 1511. Radio front end circuitry 1512 comprise one or more filters 1518 and amplifiers 1516. Radio front end circuitry 1512 is connected to antenna 1511 and processing circuitry 1520, and is configured to condition signals communicated between antenna 1511 and processing circuitry 1520. Radio front end circuitry 1512 may be coupled to or a part of antenna 1511. In some embodiments, WD 1510 may not include separate radio front end circuitry 1512; rather, processing circuitry 1520 may comprise radio front end circuitry and may be connected to antenna 1511. Similarly, in some embodiments, some or all of RF transceiver circuitry 1522 may be considered a part of interface 1514. Radio front end circuitry 1512 may receive digital data that is to be sent out to other network nodes or WDs via a wireless connection. Radio front end circuitry 1512 may convert the digital data into a radio signal having the appropriate channel and bandwidth parameters using a combination of filters 1518 and/or amplifiers 1516. The radio signal may then be transmitted via antenna 1511. Similarly, when receiving data, antenna 1511 may collect radio signals which are then converted into digital data by radio front end circuitry 1512. The digital data may be passed to processing circuitry 1520. In other embodiments, the interface may comprise different components and/or different combinations of components.

Processing circuitry 1520 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1510 components, such as device readable medium 1530, WD 1510 functionality. Such functionality may include providing any of the various wireless features or benefits discussed herein. For example, processing circuitry 1520 may execute instructions stored in device readable medium 1530 or in memory within processing circuitry 1520 to provide the functionality disclosed herein.

As illustrated, processing circuitry 1520 includes one or more of RF transceiver circuitry 1522, baseband processing circuitry 1524, and application processing circuitry 1526. In other embodiments, the processing circuitry may comprise different components and/or different combinations of components. In certain embodiments processing circuitry 1520 of WD 1510 may comprise a SOC. In some embodiments, RF transceiver circuitry 1522, baseband processing circuitry 1524, and application processing circuitry 1526 may be on separate chips or sets of chips. In alternative embodiments, part or all of baseband processing circuitry 1524 and application processing circuitry 1526 may be combined into one chip or set of chips, and RF transceiver circuitry 1522 may be on a separate chip or set of chips. In still alternative embodiments, part or all of RF transceiver circuitry 1522 and baseband processing circuitry 1524 may be on the same chip or set of chips, and application processing circuitry 1526 may be on a separate chip or set of chips. In yet other alternative embodiments, part or all of RF transceiver circuitry 1522, baseband processing circuitry 1524, and application processing circuitry 1526 may be combined in the same chip or set of chips. In some embodiments, RF transceiver circuitry 1522 may be a part of interface 1514. RF transceiver circuitry 1522 may condition RF signals for processing circuitry 1520.

In certain embodiments, some or all of the functionality described herein as being performed by a WD may be provided by processing circuitry 1520 executing instructions stored on device readable medium 1530, which in certain embodiments may be a computer-readable storage medium. In alternative embodiments, some or all of the functionality may be provided by processing circuitry 1520 without executing instructions stored on a separate or discrete device readable storage medium, such as in a hard-wired manner. In any of those particular embodiments, whether executing instructions stored on a device readable storage medium or not, processing circuitry 1520 can be configured to perform the described functionality. The benefits provided by such functionality are not limited to processing circuitry 1520 alone or to other components of WD 1510, but are enjoyed by WD 1510 as a whole, and/or by end users and the wireless network generally.

Processing circuitry 1520 may be configured to perform any determining, calculating, or similar operations (e.g., certain obtaining operations) described herein as being performed by a WD. These operations, as performed by processing circuitry 1520, may include processing information obtained by processing circuitry 1520 by, for example, converting the obtained information into other information, comparing the obtained information or converted information to information stored by WD 1510, and/or performing one or more operations based on the obtained information or converted information, and as a result of said processing making a determination.

Device readable medium 1530 may be operable to store a computer program, software, an application including one or more of logic, rules, code, tables, etc. and/or other instructions capable of being executed by processing circuitry 1520. Device readable medium 1530 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1520. In some embodiments, processing circuitry 1520 and device readable medium 1530 may be considered to be integrated.

User interface equipment 1532 may provide components that allow for a human user to interact with WD 1510. Such interaction may be of many forms, such as visual, audial, tactile, etc. User interface equipment 1532 may be operable to produce output to the user and to allow the user to provide input to WD 1510. The type of interaction may vary depending on the type of user interface equipment 1532 installed in WD 1510. For example, if WD 1510 is a smart phone, the interaction may be via a touch screen; if WD 1510 is a smart meter, the interaction may be through a screen that provides usage (e.g., the number of gallons used) or a speaker that provides an audible alert (e.g., if smoke is detected). User interface equipment 1532 may include input interfaces, devices and circuits, and output interfaces, devices and circuits. User interface equipment 1532 is configured to allow input of information into WD 1510, and is connected to processing circuitry 1520 to allow processing circuitry 1520 to process the input information. User interface equipment 1532 may include, for example, a microphone, a proximity or other sensor, keys/buttons, a touch display, one or more cameras, a USB port, or other input circuitry. User interface equipment 1532 is also configured to allow output of information from WD 1510, and to allow processing circuitry 1520 to output information from WD 1510. User interface equipment 1532 may include, for example, a speaker, a display, vibrating circuitry, a USB port, a headphone interface, or other output circuitry. Using one or more input and output interfaces, devices, and circuits, of user interface equipment 1532, WD 1510 may communicate with end users and/or the wireless network, and allow them to benefit from the functionality described herein.

Auxiliary equipment 1534 is operable to provide more specific functionality which may not be generally performed by WDs. This may comprise specialized sensors for doing measurements for various purposes, interfaces for additional types of communication such as wired communications etc. The inclusion and type of components of auxiliary equipment 1534 may vary depending on the embodiment and/or scenario.

Power source 1536 may, in some embodiments, be in the form of a battery or battery pack. Other types of power sources, such as an external power source (e.g., an electricity outlet), photovoltaic devices or power cells, may also be used. WD 1510 may further comprise power circuitry 1537 for delivering power from power source 1536 to the various parts of WD 1510 which need power from power source 1536 to carry out any functionality described or indicated herein. Power circuitry 1537 may in certain embodiments comprise power management circuitry. Power circuitry 1537 may additionally or alternatively be operable to receive power from an external power source; in which case WD 1510 may be connectable to the external power source (such as an electricity outlet) via input circuitry or an interface such as an electrical power cable. Power circuitry 1537 may also in certain embodiments be operable to deliver power from an external power source to power source 1536. This may be, for example, for the charging of power source 1536. Power circuitry 1537 may perform any formatting, converting, or other modification to the power from power source 1536 to make the power suitable for the respective components of WD 1510 to which power is supplied.

Figure 16:
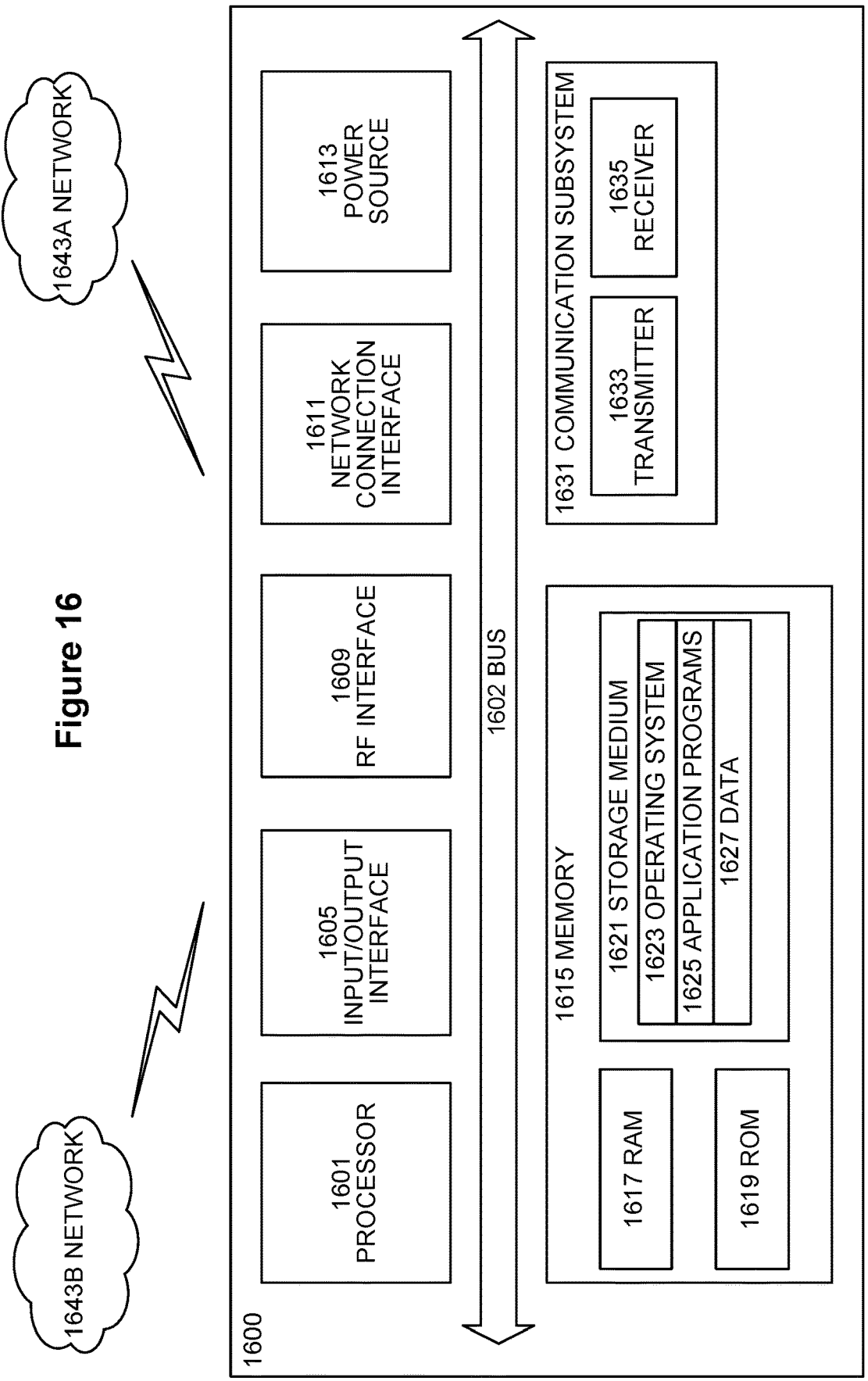
FIG. 16 is a block diagram of a user equipment in accordance with some embodiments.

FIG. 16 illustrates a user Equipment in accordance with some embodiments.

FIG. 16 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 16200 may be any UE identified by the 3rd Generation Partnership Project (3GPP), including a NB-IoT UE, a machine type communication (MTC) UE, and/or an enhanced MTC (eMTC) UE. UE 1600, as illustrated in FIG. 16, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 16 is a UE, the components discussed herein are equally applicable to a WD, and vice-versa.

In FIG. 16, UE 1600 includes processing circuitry 1601 that is operatively coupled to input/output interface 1605, radio frequency (RF) interface 1609, network connection interface 1611, memory 1615 including random access memory (RAM) 1617, read-only memory (ROM) 1619, and storage medium 1621 or the like, communication subsystem 1631, power source 1613, and/or any other component, or any combination thereof. Storage medium 1621 includes operating system 1623, application program 1625, and data 1627. In other embodiments, storage medium 1621 may include other similar types of information. Certain UEs may utilize all of the components shown in FIG. 16, or only a subset of the components. The level of integration between the components may vary from one UE to another UE. Further, certain UEs may contain multiple instances of a component, such as multiple processors, memories, transceivers, transmitters, receivers, etc.

In FIG. 16, processing circuitry 1601 may be configured to process computer instructions and data. Processing circuitry 1601 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1601 may include two central processing units (CPUs). Data may be information in a form suitable for use by a computer.

In the depicted embodiment, input/output interface 1605 may be configured to provide a communication interface to an input device, output device, or input and output device. UE 1600 may be configured to use an output device via input/output interface 1605. An output device may use the same type of interface port as an input device. For example, a USB port may be used to provide input to and output from UE 1600. The output device may be a speaker, a sound card, a video card, a display, a monitor, a printer, an actuator, an emitter, a smartcard, another output device, or any combination thereof. UE 1600 may be configured to use an input device via input/output interface 1605 to allow a user to capture information into UE 1600. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 16, RF interface 1609 may be configured to provide a communication interface to RF components such as a transmitter, a receiver, and an antenna. Network connection interface 1611 may be configured to provide a communication interface to network 1643a. Network 1643a may encompass wired and/or wireless networks such as a local-area network (LAN), a wide-area network (WAN), a computer network, a wireless network, a telecommunications network, another like network or any combination thereof. For example, network 1643a may comprise a Wi-Fi network. Network connection interface 1611 may be configured to include a receiver and a transmitter interface used to communicate with one or more other devices over a communication network according to one or more communication protocols, such as Ethernet, TCP/IP, SONET, ATM, or the like. Network connection interface 1611 may implement receiver and transmitter functionality appropriate to the communication network links (e.g., optical, electrical, and the like). The transmitter and receiver functions may share circuit components, software or firmware, or alternatively may be implemented separately.

RAM 1617 may be configured to interface via bus 1602 to processing circuitry 1601 to provide storage or caching of data or computer instructions during the execution of software programs such as the operating system, application programs, and device drivers. ROM 1619 may be configured to provide computer instructions or data to processing circuitry 1601. For example, ROM 1619 may be configured to store invariant low-level system code or data for basic system functions such as basic input and output (I/O), startup, or reception of keystrokes from a keyboard that are stored in a non-volatile memory. Storage medium 1621 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1621 may be configured to include operating system 1623, application program 1625 such as a web browser application, a widget or gadget engine or another application, and data file 1627. Storage medium 1621 may store, for use by UE 1600, any of a variety of various operating systems or combinations of operating systems.

Storage medium 1621 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1621 may allow UE 1600 to access computer-executable instructions, application programs or the like, stored on transitory or non-transitory memory media, to off-load data, or to upload data. An article of manufacture, such as one utilizing a communication system may be tangibly embodied in storage medium 1621, which may comprise a device readable medium.

In FIG. 16, processing circuitry 1601 may be configured to communicate with network 1643b using communication subsystem 1631. Network 1643a and network 1643b may be the same network or networks or different network or networks. Communication subsystem 1631 may be configured to include one or more transceivers used to communicate with network 1643b. For example, communication subsystem 1631 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1633 and/or receiver 1635 to implement transmitter or receiver functionality, respectively, appropriate to the RAN links (e.g., frequency allocations and the like). Further, transmitter 1633 and receiver 1635 of each transceiver may share circuit components, software or firmware, or alternatively may be implemented separately.

In the illustrated embodiment, the communication functions of communication subsystem 1631 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1631 may include cellular communication, Wi-Fi communication, Bluetooth communication, and GPS communication. Network 1643*b* may encompass wired and/or wireless networks such as a local-area network (LAN), a wide-area network (WAN), a computer network, a wireless network, a telecommunications network, another like network or any combination thereof. For example, network 1643*b* may be a cellular network, a Wi-Fi network, and/or a near-field network. Power source 1613 may be configured to provide alternating current (AC) or direct current (DC) power to components of UE 1600.

The features, benefits and/or functions described herein may be implemented in one of the components of UE 1600 or partitioned across multiple components of UE 1600. Further, the features, benefits, and/or functions described herein may be implemented in any combination of hardware, software or firmware. In one example, communication subsystem 1631 may be configured to include any of the components described herein. Further, processing circuitry 1601 may be configured to communicate with any of such components over bus 1602. In another example, any of such components may be represented by program instructions stored in memory that when executed by processing circuitry 1601 perform the corresponding functions described herein. In another example, the functionality of any of such components may be partitioned between processing circuitry 1601 and communication subsystem 1631. In another example, the non-computationally intensive functions of any of such components may be implemented in software or firmware and the computationally intensive functions may be implemented in hardware.

Figure 17:
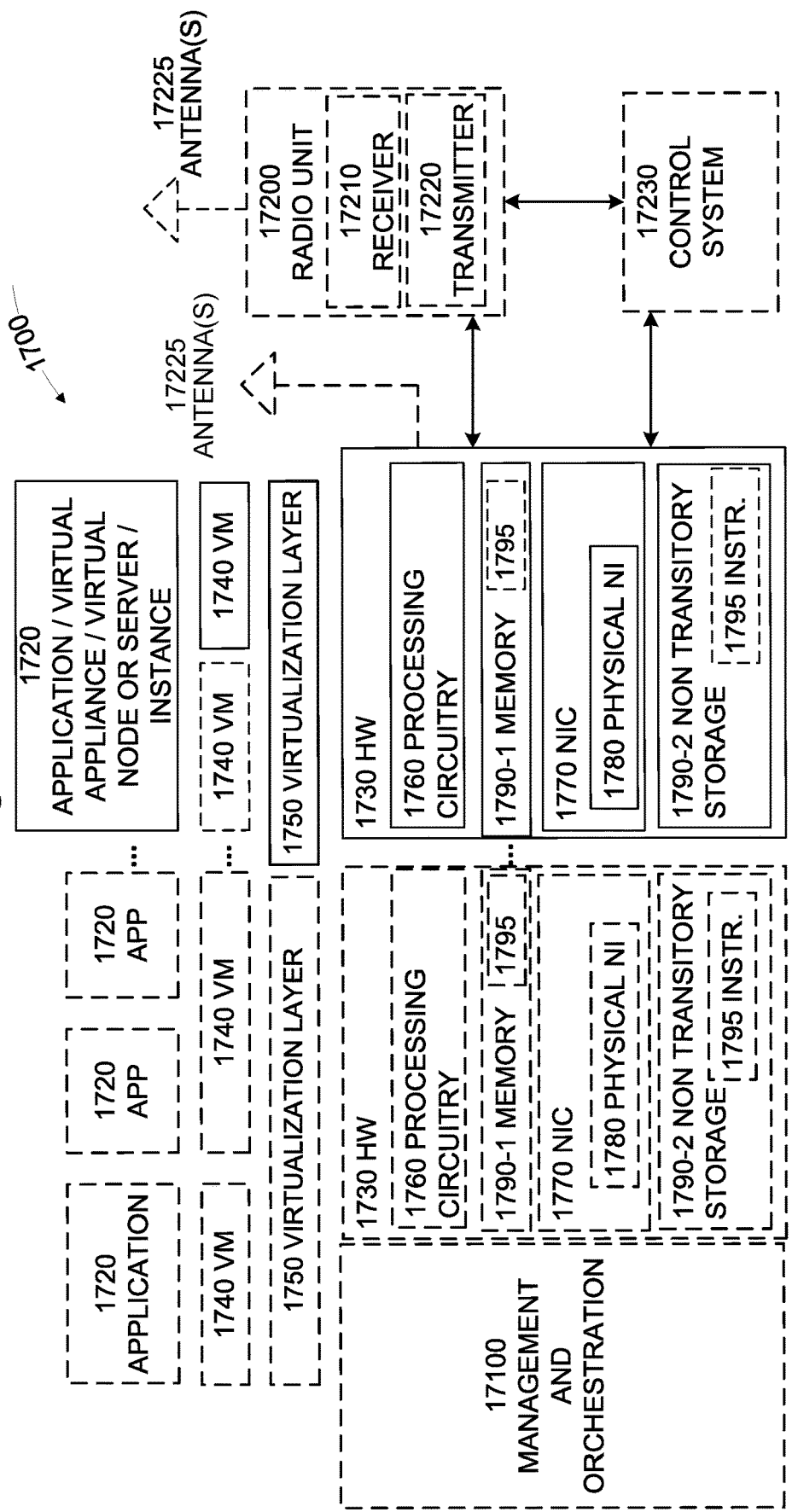
FIG. 17 is a block diagram of a virtualization environment in accordance with some embodiments.

FIG. 17 illustrates a virtualization environment in accordance with some embodiments.

FIG. 17 is a schematic block diagram illustrating a virtualization environment 1700 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1700 hosted by one or more of hardware nodes 1730. Further, in embodiments in which the virtual node is not a radio access node or does not require radio connectivity (e.g., a core network node), then the network node may be entirely virtualized.

The functions may be implemented by one or more applications 1720 (which may alternatively be called software instances, virtual appliances, network functions, virtual nodes, virtual network functions, etc.) operative to implement some of the features, functions, and/or benefits of some of the embodiments disclosed herein. Applications 1720 are run in virtualization environment 1700 which provides hardware 1730 comprising processing circuitry 1760 and memory 1790. Memory 1790 contains instructions 1795 executable by processing circuitry 1760 whereby application 1720 is operative to provide one or more of the features, benefits, and/or functions disclosed herein.

Virtualization environment 1700, comprises general-purpose or special-purpose network hardware devices 1730 comprising a set of one or more processors or processing circuitry 1760, which may be commercial off-the-shelf (COTS) processors, dedicated Application Specific Integrated Circuits (ASICs), or any other type of processing circuitry including digital or analog hardware components or special purpose processors. Each hardware device may comprise memory 1790-1 which may be non-persistent memory for temporarily storing instructions 1795 or software executed by processing circuitry 1760. Each hardware device may comprise one or more network interface controllers (NICs) 1770, also known as network interface cards, which include physical network interface 1780. Each hardware device may also include non-transitory, persistent, machine-readable storage media 1790-2 having stored therein software 1795 and/or instructions executable by processing circuitry 1760. Software 1795 may include any type of software including software for instantiating one or more virtualization layers 1750 (also referred to as hypervisors), software to execute virtual machines 1740 as well as software allowing it to execute functions, features and/or benefits described in relation with some embodiments described herein.

Virtual machines 1740 comprise virtual processing, virtual memory, virtual networking or interface and virtual storage, and may be run by a corresponding virtualization layer 1750 or hypervisor. Different embodiments of the instance of virtual appliance 1720 may be implemented on one or more of virtual machines 1740, and the implementations may be made in different ways.

During operation, processing circuitry 1760 executes software 1795 to instantiate the hypervisor or virtualization layer 1750, which may sometimes be referred to as a virtual machine monitor (VMM). Virtualization layer 1750 may present a virtual operating platform that appears like networking hardware to virtual machine 1740.

As shown in FIG. 17, hardware 1730 may be a standalone network node with generic or specific components. Hardware 1730 may comprise antenna 17225 and may implement some functions via virtualization. Alternatively, hardware 1730 may be part of a larger cluster of hardware (e.g. such as in a data center or customer premise equipment (CPE)) where many hardware nodes work together and are managed via management and orchestration (MANO) 17100, which, among others, oversees lifecycle management of applications 1720.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1740 may be a software implementation of a physical machine that runs programs as if they were executing on a physical, non-virtualized machine. Each of virtual machines 1740, and that part of hardware 1730 that executes that virtual machine, be it hardware dedicated to that virtual machine and/or hardware shared by that virtual machine with others of the virtual machines 1740, forms a separate virtual network elements (VNE).

Still in the context of NFV, Virtual Network Function (VNF) is responsible for handling specific network functions that run in one or more virtual machines 1740 on top of hardware networking infrastructure 1730 and corresponds to application 1720 in FIG. 17.

In some embodiments, one or more radio units 17200 that each include one or more transmitters 17220 and one or more receivers 17210 may be coupled to one or more antennas 17225. Radio units 17200 may communicate directly with hardware nodes 1730 via one or more appropriate network interfaces and may be used in combination with the virtual components to provide a virtual node with radio capabilities, such as a radio access node or a base station.

In some embodiments, some signalling can be effected with the use of control system 17230 which may alternatively be used for communication between the hardware nodes 1730 and radio units 17200.

Figure QQ4 illustrates a telecommunication network connected via an intermediate network to a host computer in accordance with some embodiments.

With reference to Figure QQ4, in accordance with an embodiment, a communication system includes telecommunication network 1810, such as a 3GPP-type cellular network, which comprises access network 1811, such as a radio access network, and core network 1814. Access network 1811 comprises a plurality of base stations 1812a, 1812b, 1812c, such as NBs, eNBs, gNBs or other types of wireless access points, each defining a corresponding coverage area 1813a, 1813b, 1813c. Each base station 1812a, 1812b, 1812c is connectable to core network 1814 over a wired or wireless connection 1815. A first UE 1891 located in coverage area 1813c is configured to wirelessly connect to, or be paged by, the corresponding base station 1812c. A second UE 1892 in coverage area 1813a is wirelessly connectable to the corresponding base station 1812a. While a plurality of UEs 1891, 1892 are illustrated in this example, the disclosed embodiments are equally applicable to a situation where a sole UE is in the coverage area or where a sole UE is connecting to the corresponding base station 1812.

Telecommunication network 1810 is itself connected to host computer 1830, which may be embodied in the hardware and/or software of a standalone server, a cloud-implemented server, a distributed server or as processing resources in a server farm. Host computer 1830 may be under the ownership or control of a service provider, or may be operated by the service provider or on behalf of the service provider. Connections 1821 and 1822 between telecommunication network 1810 and host computer 1830 may extend directly from core network 1814 to host computer 1830 or may go via an optional intermediate network 1820. Intermediate network 1820 may be one of, or a combination of more than one of, a public, private or hosted network; intermediate network 1820, if any, may be a backbone network or the Internet; in particular, intermediate network 1820 may comprise two or more sub-networks (not shown).

Figure 18:
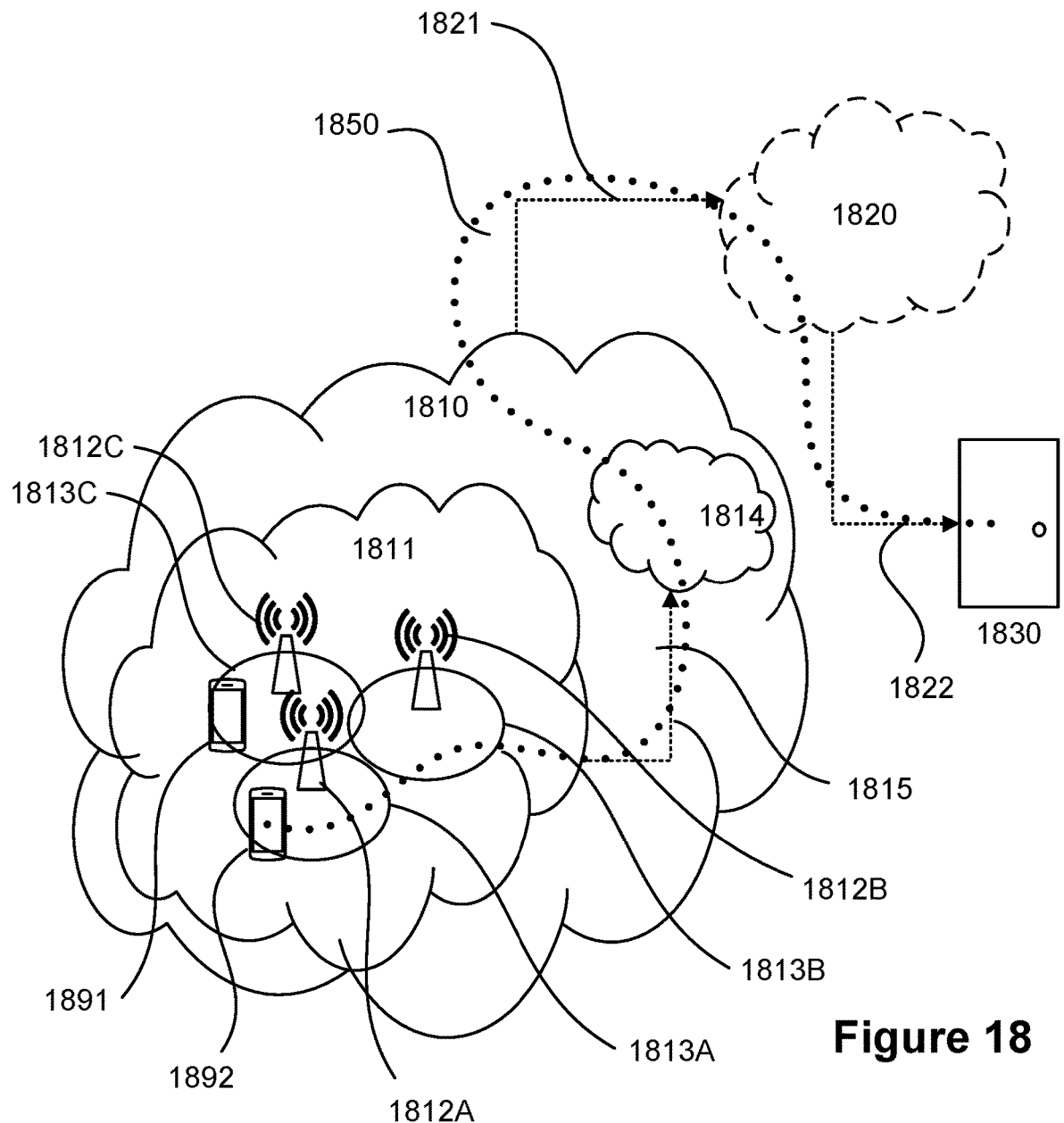
FIG. 18 is a block diagram of a telecommunication network connected via an intermediate network to a host computer in accordance with some embodiments.

The communication system of FIG. 18 as a whole enables connectivity between the connected UEs 1891, 1892 and host computer 1830. The connectivity may be described as an over-the-top (OTT) connection 1850. Host computer 1830 and the connected UEs 1891, 1892 are configured to communicate data and/or signaling via OTT connection 1850, using access network 1811, core network 1814, any intermediate network 1820 and possible further infrastructure (not shown) as intermediaries. OTT connection 1850 may be transparent in the sense that the participating communication devices through which OTT connection 1850 passes are unaware of routing of uplink and downlink communications. For example, base station 1812 may not or need not be informed about the past routing of an incoming downlink communication with data originating from host computer 1830 to be forwarded (e.g., handed over) to a connected UE 1891. Similarly, base station 1812 need not be aware of the future routing of an outgoing uplink communication originating from the UE 1891 towards the host computer 1830.

Figure 19:
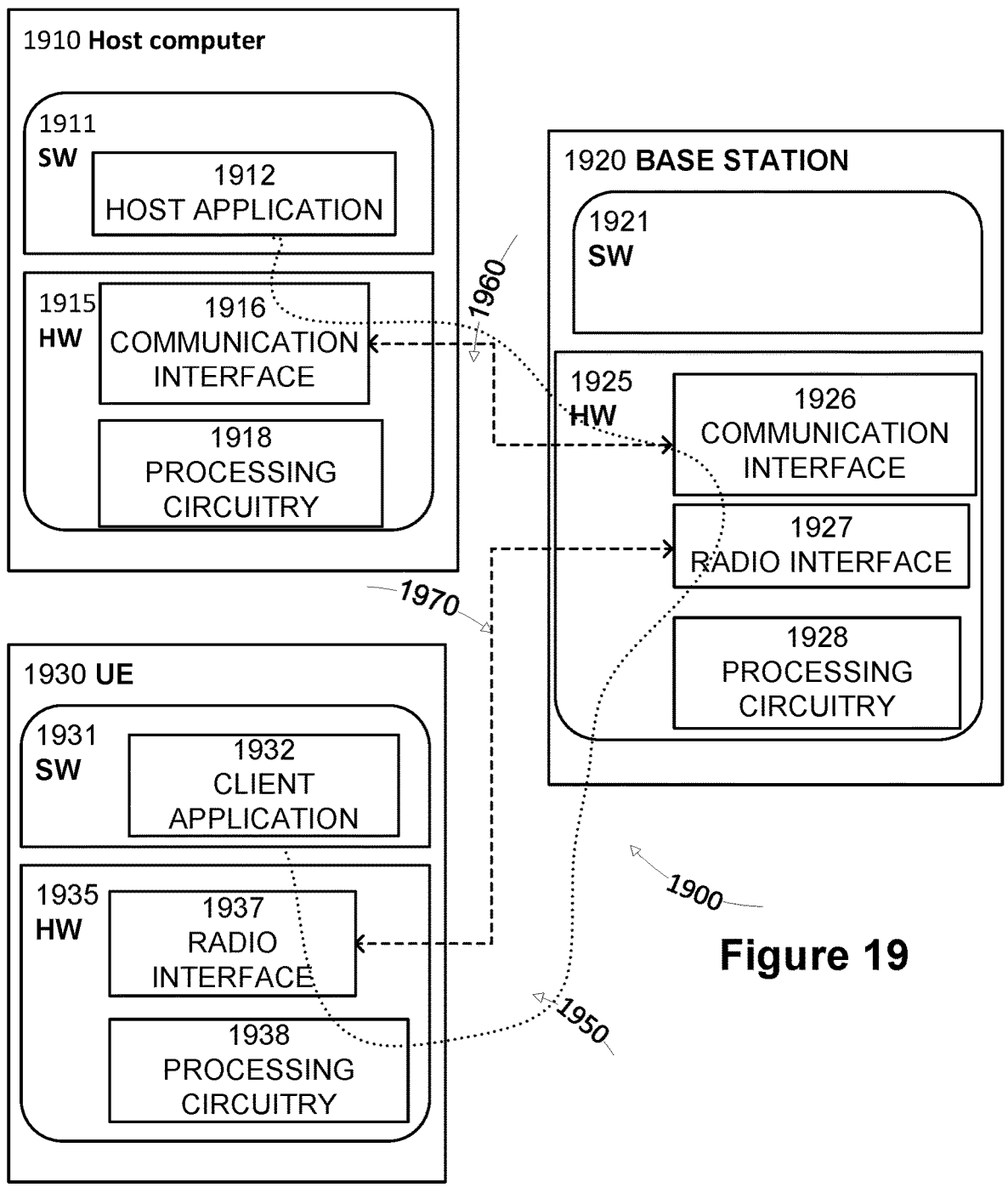
FIG. 19 is a block diagram of a host computer communicating via a base station with a user equipment over a partially wireless connection in accordance with some embodiments.

FIG. 19 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 19. In communication system 1900, host computer 1910 comprises hardware 1915 including communication interface 1916 configured to set up and maintain a wired or wireless connection with an interface of a different communication device of communication system 1900. Host computer 1910 further comprises processing circuitry 1918, which may have storage and/or processing capabilities. In particular, processing circuitry 1918 may comprise one or more programmable processors, application-specific integrated circuits, field programmable gate arrays or combinations of these (not shown) adapted to execute instructions. Host computer 1910 further comprises software 1911, which is stored in or accessible by host computer 1910 and executable by processing circuitry 1918. Software 1911 includes host application 1912. Host application 1912 may be operable to provide a service to a remote user, such as UE 1930 connecting via OTT connection 1950 terminating at UE 1930 and host computer 1910. In providing the service to the remote user, host application 1912 may provide user data which is transmitted using OTT connection 1950.

Communication system 1900 further includes base station 1920 provided in a telecommunication system and comprising hardware 1925 enabling it to communicate with host computer 1910 and with UE 1930. Hardware 1925 may include communication interface 1926 for setting up and maintaining a wired or wireless connection with an interface of a different communication device of communication system 1900, as well as radio interface 1927 for setting up and maintaining at least wireless connection 1970 with UE 1930 located in a coverage area (not shown in FIG. 19) served by base station 1920. Communication interface 1926 may be configured to facilitate connection 1960 to host computer 1910. Connection 1960 may be direct or it may pass through a core network (not shown in FIG. 19) of the telecommunication system and/or through one or more intermediate networks outside the telecommunication system. In the embodiment shown, hardware 1925 of base station 1920 further includes processing circuitry 1928, which may comprise one or more programmable processors, application-specific integrated circuits, field programmable gate arrays or combinations of these (not shown) adapted to execute instructions. Base station 1920 further has software 1921 stored internally or accessible via an external connection.

Communication system 1900 further includes UE 1930 already referred to. Its hardware 1935 may include radio interface 1937 configured to set up and maintain wireless connection 1970 with a base station serving a coverage area in which UE 1930 is currently located. Hardware 1935 of UE 1930 further includes processing circuitry 1938, which may comprise one or more programmable processors, application-specific integrated circuits, field programmable gate arrays or combinations of these (not shown) adapted to execute instructions. UE 1930 further comprises software 1931, which is stored in or accessible by UE 1930 and executable by processing circuitry 1938. Software 1931 includes client application 1932. Client application 1932 may be operable to provide a service to a human or non-human user via UE 1930, with the support of host computer 1910. In host computer 1910, an executing host application 1912 may communicate with the executing client application 1932 via OTT connection 1950 terminating at UE 1930 and host computer 1910. In providing the service to the user, client application 1932 may receive request data from host application 1912 and provide user data in response to the request data. OTT connection 1950 may transfer both the request data and the user data. Client application 1932 may interact with the user to generate the user data that it provides.

It is noted that host computer 1910, base station 1920 and UE 1930 illustrated in FIG. 19 may be similar or identical to host computer 1830, one of base stations 1812*a*, 1812*b*, 1812*c* and one of UEs 1891, 1892 of FIG. 18, respectively. This is to say, the inner workings of these entities may be as shown in FIG. 19 and independently, the surrounding network topology may be that of FIG. 18.

In FIG. 19, OTT connection 1950 has been drawn abstractly to illustrate the communication between host computer 1910 and UE 1930 via base station 1920, without explicit reference to any intermediary devices and the precise routing of messages via these devices. Network infrastructure may determine the routing, which it may be configured to hide from UE 1930 or from the service provider operating host computer 1910, or both. While OTT connection 1950 is active, the network infrastructure may further take decisions by which it dynamically changes the routing (e.g., on the basis of load balancing consideration or reconfiguration of the network).

Wireless connection 1970 between UE 1930 and base station 1920 is in accordance with the teachings of the embodiments described throughout this disclosure. One or more of the various embodiments may improve the performance of OTT services provided to UE 1930 using OTT connection 1950, in which wireless connection 1970 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 1950 between host computer 1910 and UE 1930, in response to variations in the measurement results. The measurement procedure and/or the network functionality for reconfiguring OTT connection 1950 may be implemented in software 1911 and hardware 1915 of host computer 1910 or in software 1931 and hardware 1935 of UE 1930, or both. In embodiments, sensors (not shown) may be deployed in or in association with communication devices through which OTT connection 1950 passes; the sensors may participate in the measurement procedure by supplying values of the monitored quantities exemplified above, or supplying values of other physical quantities from which software 1911, 1931 may compute or estimate the monitored quantities. The reconfiguring of OTT connection 1950 may include message format, retransmission settings, preferred routing etc.; the reconfiguring need not affect base station 1920, and it may be unknown or imperceptible to base station 1920. Such procedures and functionalities may be known and practiced in the art. In certain embodiments, measurements may involve proprietary UE signaling facilitating host computer 1910's measurements of throughput, propagation times, latency and the like. The measurements may be implemented in that software 1911 and 1931 causes messages to be transmitted, in particular empty or 'dummy' messages, using OTT connection 1950 while it monitors propagation times, errors etc.

FIG. 20 illustrates methods implemented in a communication system including a host computer, a base station and a user equipment in accordance with some embodiments.

FIG. 20 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 20 will be included in this section. In step 2010, the host computer provides user data. In substep 2011 (which may be optional) of step 2010, the host computer provides the user data by executing a host application. In step 2020, the host computer initiates a transmission carrying the user data to the UE. In step 2030 (which may be optional), the base station transmits to the UE the user data which was carried in the transmission that the host computer initiated, in accordance with the teachings of the embodiments described throughout this disclosure. In step 2040 (which may also be optional), the UE executes a client application associated with the host application executed by the host computer.

FIG. 21 illustrates methods implemented in a communication system including a host computer, a base station and a user equipment in accordance with some embodiments.

FIG. 21 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 21 will be included in this section. In step 2110 of the method, the host computer provides user data. In an optional substep (not shown) the host computer provides the user data by executing a host application. In step 2120, the host computer initiates a transmission carrying the user data to the UE. The transmission may pass via the base station, in accordance with the teachings of the embodiments described throughout this disclosure. In step 2130 (which may be optional), the UE receives the user data carried in the transmission.

Figure 22:
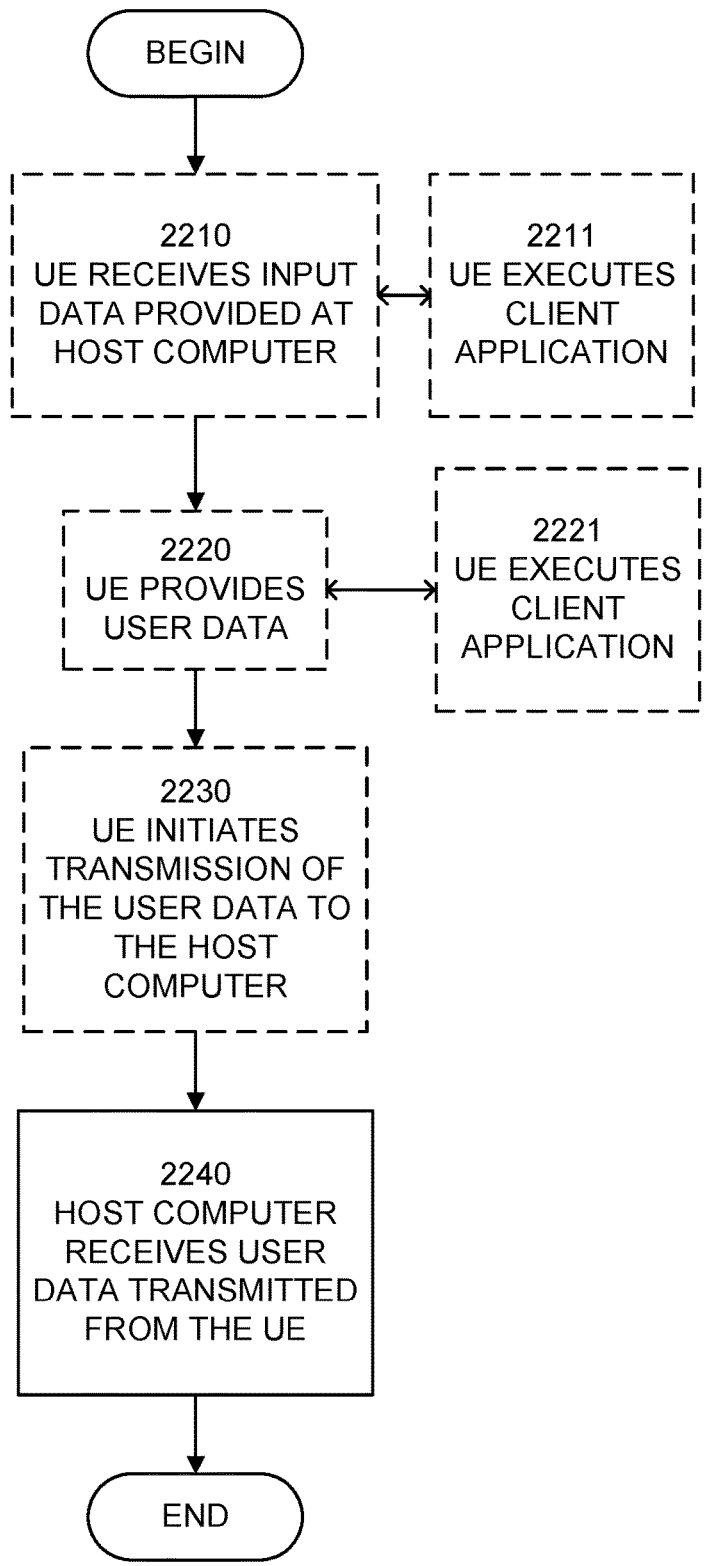
FIG. 22 is a block diagram of methods implemented in a communication system including a host computer, a base station and a user equipment in accordance with some embodiments.

FIG. 22 illustrates methods implemented in a communication system including a host computer, a base station and a user equipment in accordance with some embodiments.

FIG. 22 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 22 will be included in this section. In step 2210 (which may be optional), the UE receives input data provided by the host computer. Additionally or alternatively, in step 2220, the UE provides user data. In substep 2221 (which may be optional) of step 2220, the UE provides the user data by executing a client application. In substep 2211 (which may be optional)

of step 2210, the UE executes a client application which provides the user data in reaction to the received input data provided by the host computer. In providing the user data, the executed client application may further consider user input received from the user. Regardless of the specific manner in which the user data was provided, the UE initiates, in substep 2230 (which may be optional), transmission of the user data to the host computer. In step 2240 of the method, the host computer receives the user data transmitted from the UE, in accordance with the teachings of the embodiments described throughout this disclosure.

Figure 23:
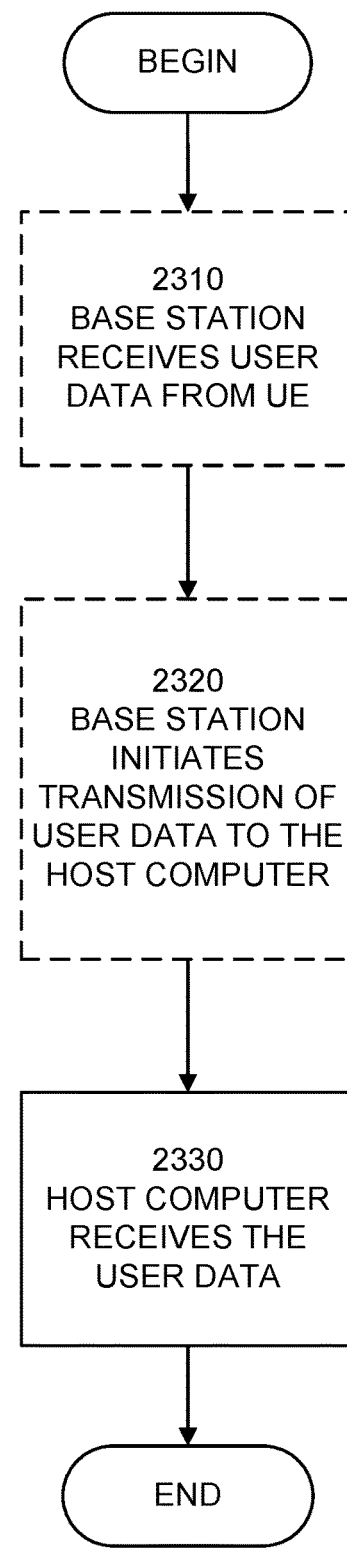
FIG. 23 is a block diagram of methods implemented in a communication system including a host computer, a base station and a user equipment in accordance with some embodiments.

FIG. 23 illustrates methods implemented in a communication system including a host computer, a base station and a user equipment in accordance with some embodiments FIG. 23 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 23 will be included in this section. In step 2310 (which may be optional), in accordance with the teachings of the embodiments described throughout this disclosure, the base station receives user data from the UE. In step 2320 (which may be optional), the base station initiates transmission of the received user data to the host computer. In step 2330 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a first communication device, the method comprising:
   selecting a resource within a resource selection window for an initial transmission of a first Medium Access Control (MAC) protocol data unit (PDU) of multiple MAC PDUs for periodic transmission by the first communication device over a device-to-device (D2D) link to a second communication device; and
   selecting a period for periodic transmission of the multiple MAC PDUs that is at least as long as a duration of the resource selection window, so that initial transmissions of all MAC PDUs of the multiple MAC PDUs other than the first MAC PDU occur in resources after the resource selection window.

2. The method of claim 1, wherein the resource selection window is bounded by a first slot having a first slot number and a second slot having a second slot number greater than the first slot number.

3. The method of claim 2, wherein the duration of the resource selection window is the second slot minus the first slot.

4. The method of claim 1, further comprising:
   transmitting the initial transmission of the first MAC PDU over the D2D link to the second communication device using the resource selected within the resource selection window.

5. The method of claim 4, wherein all resources for retransmissions of the first MAC PDU are restricted to the resource selection window.

6. The method of claim 1, further comprising:
   selecting a resource after the resource selection window for an initial transmission of a second MAC PDU of the multiple MAC PDUs, wherein the resource after the resource selection window is selected based on the period; and
   transmitting the initial transmission of the second MAC PDU of the multiple MAC PDUs over the D2D link using the resource after the resource selection window.

7. The method of claim 1, further comprising:
   selecting one or more resources for retransmissions of the first MAC PDU within the resource selection window; and
   transmitting a retransmission of the first MAC PDU over the D2D link to the second communication device using a first one of the one or more resources for retransmission.

8. The method of claim 1, wherein the first communication device is configured to provide up to N retransmissions for each of the multiple MAC PDUs, where N is greater than zero, the method further comprising:
   after selecting the resource within the resource selection window for the initial transmission of the first MAC PDU, determining whether sufficient resources are available for N retransmissions of the first MAC PDU in the resource selection window; and
   responsive to determining that sufficient resources are not available for N retransmissions of the first MAC PDU in the resource selection window, blocking all retransmission of the first MAC PDU.

9. The method of claim 1, wherein the first communication device is configured to provide up to N retransmissions for each of the multiple MAC PDUs, where N is greater than zero, the method further comprising:
   after selecting the resource within the resource selection window for the initial transmission of the first MAC PDU, determining that resources are available for only M retransmissions of the first MAC PDU in the resource selection window, where M is less than N and M is greater than zero; and
   responsive to determining that resources are available for only M retransmissions of the first MAC PDU in the resource selection window, limiting retransmission of the first MAC PDU to M retransmissions.

10. The method of claim 1, wherein the first communication device is configured to provide up to N retransmissions for each of the multiple MAC PDUs, where N is greater than zero, the method further comprising:
    after selecting the resource within the resource selection window for the initial transmission of the first MAC PDU, determining that resources are available for only M retransmissions of the first MAC PDU in the resource selection window, where M is less than N and M is greater than zero; and responsive to determining that resources are available for only M retransmissions of the first MAC PDU in the resource selection window, selecting M resources of the resource selection window for retransmissions of the first MAC PDU.

11. The method of claim 1, wherein the resource comprises at least one slot.

12. The method of claim 1, wherein the period is a resource reservation interval.

13. A first communication device, comprising:
radio circuitry configured for communication with a wireless network; and
processing circuitry operatively coupled to the radio circuitry and configured to:
select a resource within a resource selection window for an initial transmission of a first Medium Access Control (MAC) protocol data unit (PDU) of multiple MAC PDUs for periodic transmission by the first communication device over a device-to-device (D2D) link to a second communication device; and
select a period for periodic transmission of the multiple MAC PDUs that is at least as long as a duration of the resource selection window, so that initial transmissions of all MAC PDUs of the multiple MAC PDUs other than the first MAC PDU occur in resources after the resource selection window.

14. The first communication device of claim 13, wherein the resource selection window is bounded by a first slot having a first slot number and a second slot having a second slot number greater than the first slot number.

15. The first communication device of 13, wherein the processing circuitry is further configured to use the radio circuitry to:
transmit the initial transmission of the first MAC PDU over the D2D link to the second communication device using the resource selected within the resource selection window.

16. The first communication device of claim 15, wherein all resources for retransmissions of the first MAC PDU are restricted to the resource selection window.

17. The first communication device of claim 13, wherein the processing circuitry is further configured to:
select a resource after the resource selection window for an initial transmission of a second MAC PDU of the multiple MAC PDUs, wherein the resource after the resource selection window is selected based on the period; and
use the radio circuitry to transmit the initial transmission of the second MAC PDU of the multiple MAC PDUs over the D2D link using the resource after the resource selection window.

18. The first communication device of claim 13, wherein the processing circuitry is further configured to:
select one or more resources for retransmissions of the first MAC PDU within the resource selection window; and
use the radio circuitry to transmit a retransmission of the first MAC PDU over the D2D link to the second communication device using a first one of the one or more resources for retransmission.

19. The first communication device of claim 13, wherein the processing circuitry is configured to provide up to N retransmissions for each of the multiple MAC PDUs, where N is greater than zero, and wherein the processing circuitry is further configured to:
after selecting the resource within the resource selection window for the initial transmission of the first MAC PDU, determine whether sufficient resources are available for N retransmissions of the first MAC PDU in the resource selection window; and
responsive to determining that sufficient resources are not available for N retransmissions of the first MAC PDU in the resource selection window, block all retransmission of the first MAC PDU.

20. The first communication device of claim 13, wherein the processing circuitry is configured to provide up to N retransmissions for each of the multiple MAC PDUs, where N is greater than zero, and wherein the processing circuitry is further configured to:
after selecting the resource within the resource selection window for the initial transmission of the first MAC PDU, determine that resources are available for only M retransmissions of the first MAC PDU in the resource selection window, where M is less than N and M is greater than zero; and
responsive to determining that resources are available for only M retransmissions of the first MAC PDU in the resource selection window, limit retransmission of the first MAC PDU to M retransmissions.

21. The first communication device of claim 13, wherein the processing circuitry is configured to provide up to N retransmissions for each of the multiple MAC PDUs, where N is greater than zero, and wherein the processing circuitry is further configured to:
after selecting the resource within the resource selection window for the initial transmission of the first MAC PDU, determine that resources are available for only M retransmissions of the first MAC PDU in the resource selection window, where M is less than N and M is greater than zero; and
responsive to determining that resources are available for only M retransmissions of the first MAC PDU in the resource selection window, select M resources of the resource selection window for retransmissions of the first MAC PDU.

22. A non-transitory computer-readable medium comprising, stored thereupon, a computer program comprising program code to be executed by at least one processor of a first communication device, wherein the program code is configured so that execution of the program code causes the first communication device to:
select a resource within a resource selection window for an initial transmission of a first Medium Access Control (MAC) protocol data unit (PDU) of multiple MAC PDUs for periodic transmission by the first communication device over a device-to-device (D2D) link to a second communication device; and
select a period for periodic transmission of the multiple MAC PDUs that is at least as long as a duration of the resource selection window, so that initial transmissions of all MAC PDUs of the multiple MAC PDUs other than the first MAC PDU occur in resources after the resource selection window.

* * * * *

UNITED STATES PATENT AND TRADEMARK OFFICE
CERTIFICATE OF CORRECTION

| | | |
|---|---|---|
| PATENT NO. | : 12,273,207 B2 | Page 1 of 4 |
| APPLICATION NO. | : 17/799491 | |
| DATED | : April 8, 2025 | |
| INVENTOR(S) | : Zhang et al. | |

It is certified that error appears in the above-identified patent and that said Letters Patent is hereby corrected as shown below:

In the Drawings

In Fig. 15, Sheet 11 of 17, for Tag "1572", in Line 1, delete "TRANCEIVER" and insert -- TRANSCEIVER --, therefor.

In Fig. 15, Sheet 11 of 17, for Tag "1522", in Line 2, delete "TRANCEIVER" and insert -- TRANSCEIVER --, therefor.

In the Specification

In Column 1, Line 34, delete "Release12," and insert -- Release 12, --, therefor.

In Column 1, Line 62, delete "Rel. 16." and insert -- Rel-16. --, therefor.

In Column 2, Line 3, delete "unclear" and insert -- unclear. --, therefor.

In Column 4, Line 50, delete "unclear" and insert -- unclear. --, therefor.

Figure 7:
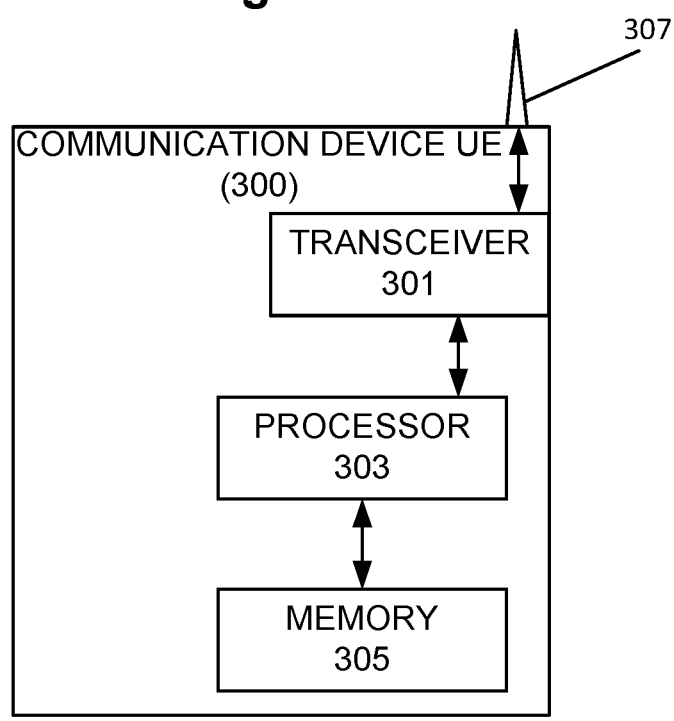
FIG. 7 is a block diagram illustrating a communication device UE according to some embodiments of inventive concepts.

In Column 5, Line 44, delete "FIG. 3" and insert -- FIG. 7 --, therefor.

In Column 7, Line 9, delete "TB #1 at operation 201" and insert -- TB #1 at operation 251 --, therefor.

In Column 7, Line 12, delete "NACK at operation 202," and insert -- NACK at operation 252, --, therefor.

In Column 8, Line 16, delete "approve" and insert -- approved --, therefor.

Signed and Sealed this
Thirtieth Day of December, 2025

John A. Squires
*Director of the United States Patent and Trademark Office*

CERTIFICATE OF CORRECTION (continued)
U.S. Pat. No. 12,273,207 B2

In Column 8, Line 33, delete "(re-) selection" and insert -- (re-)selection --, therefor.

In Column 8, Line 33, delete "check;" and insert -- check: --, therefor,

In Column 8, Line 50, delete "carrier." and insert -- carrier; --, therefor.

In Column 8, Line 67, delete "grant." and insert -- grant; --, therefor.

In Column 9, Line 48, delete "PDUs by" and insert -- PDUs --, therefor.

In Column 12, Line 10, delete "Ran1 #98" and insert -- RAN1 #98 --, therefor.

In Column 12, Line 31, delete "procedure" and insert -- procedure. --, therefor.

In Column 12, Line 49, delete "one more" and insert -- one or more --, therefor.

In Column 13, Lines 62-63, delete "retransmission" and insert -- retransmission. --, therefor.

In Column 13, Line 65, delete "possible" and insert -- possible. --, therefor.

In Column 13, Lines 65-67, delete "Proposal 2 ........ T2-T1." and insert the same on Line 66, as a new sub-point.

In Column 17, Line 27, delete "of the of the" and insert -- of the --, therefor.

In Column 18, Line 14, delete "of the of the" and insert -- of the --, therefor.

In Column 18, Line 18, delete "on slot" and insert -- one slot --, therefor.

In Column 18, Line 39, delete "method of and of Embodiments" and insert -- method of any of Embodiments --, therefor.

In Column 18, Line 42, delete "method of Embodiment 1-2," and insert -- method of any of Embodiments 1-2, --, therefor.

In Column 18, Line 49, delete "method of Embodiment 1-2," and insert -- method of any of Embodiments 1-2, --, therefor.

In Column 23, Line 16, delete "any of any of" and insert -- any of --, therefor.

In Column 25, Line 36, delete "of the of the" and insert -- of the --, therefor.

CERTIFICATE OF CORRECTION (continued)
U.S. Pat. No. 12,273,207 B2

In Column 27, Line 8, delete "LCH Logical Channel Group" and insert -- LCG Logical Channel Group --, therefor.

In Column 27, Line 36, delete "Wide CDMA" and insert -- Wideband CDMA --, therefor.

In Column 27, Line 37, delete "Wide Local Area Network" and insert -- Wireless Local Area Network --, therefor.

In Column 27, Line 43, delete "(Release 15)"" and insert -- (Release 15)". --, therefor.

In Column 27, Line 48, delete "(ZTE)" and insert -- (ZTE). --, therefor.

In Column 27, Line 50, delete "2019" and insert -- 2019. --, therefor.

In Column 30, Line 50, delete "units" and insert -- units. --, therefor.

In Column 33, Line 6, delete "cameras," and insert -- camera, --, therefor.

In Column 33, Line 12, delete "(CPE)." and insert -- (CPE), --, therefor.

In Column 33, Line 30, delete "etc.) personal" and insert -- etc.), personal --, therefor.

In Column 36, Line 33, delete "user Equipment" and insert -- user equipment --, therefor.

In Column 36, Line 46, delete "UE 16200" and insert -- UE 1600 --, therefor.

In Column 36, Line 54, delete "term" and insert -- terms --, therefor.

In Column 36, Line 55, delete "interchangeable." and insert -- interchangeably. --, therefor.

In Column 40, Line 3, delete "memory 1790. Memory 1790" and insert -- memory 1790-1. Memory 1790-1 --, therefor.

In Column 41, Line 22, delete "Figure QQ4" and insert -- FIG. 18 --, therefor.

In Column 41, Line 25, delete "Figure QQ4," and insert -- FIG. 18, --, therefor.

In Column 44, Line 10, delete "in that" and insert -- such that --, therefor.

In Column 45, Line 7, delete "substep 2230" and insert -- step 2230 --, therefor.

In Column 45, Line 14, delete "embodiments" and insert -- embodiments. --, therefor.

In Column 45, Line 49, delete "according one" and insert -- according to one --, therefor.

In the Claims

In Column 49, Line 33, in Claim 15, delete "device of 13," and insert -- device of claim 13, --, therefor.